United States Patent
Takahashi et al.

(10) Patent No.: US 10,454,139 B2
(45) Date of Patent: Oct. 22, 2019

(54) ELECTROLYTIC SOLUTION FOR NONAQUEOUS ELECTROLYTIC SOLUTION SECONDARY BATTERIES AND NONAQUEOUS ELECTROLYTIC SOLUTION SECONDARY BATTERY

(71) Applicant: Central Glass Company, Limited, Ube, Yamaguchi (JP)

(72) Inventors: Mikihiro Takahashi, Ube (JP); Takayoshi Morinaka, Ube (JP); Masutaka Shinmen, Ube (JP); Wataru Kawabata, Ube (JP); Makoto Kubo, Ube (JP); Hiroki Matsuzaki, Ube (JP); Shoichi Tsujioka, Ube (JP); Kenta Yamamoto, Ube (JP)

(73) Assignee: Central Glass Co., Ltd., Ube (JP)

( * ) Notice: Subject to any disclaimer, the term of this patent is extended or adjusted under 35 U.S.C. 154(b) by 175 days.

(21) Appl. No.: 15/545,187

(22) PCT Filed: Dec. 28, 2015

(86) PCT No.: PCT/JP2015/086515
§ 371 (c)(1),
(2) Date: Nov. 13, 2017

(87) PCT Pub. No.: WO2016/117279
PCT Pub. Date: Jul. 28, 2016

(65) Prior Publication Data
US 2018/0062204 A1    Mar. 1, 2018

(30) Foreign Application Priority Data
Jan. 23, 2015    (JP) .................................. 2015-011731

(51) Int. Cl.
*H01M 10/05*    (2010.01)
*H01M 2/16*    (2006.01)
(Continued)

(52) U.S. Cl.
CPC ......... *H01M 10/0568* (2013.01); *H01M 2/16* (2013.01); *H01M 2/162* (2013.01);
(Continued)

(58) Field of Classification Search
None
See application file for complete search history.

(56) References Cited

U.S. PATENT DOCUMENTS

| 5,626,981 A | 5/1997 | Simon et al. |
| 6,506,516 B1 | 1/2003 | Wietelmann et al. |

(Continued)

FOREIGN PATENT DOCUMENTS

| CN | 102273000 A | 12/2011 |
| CN | 102714334 A | 10/2012 |

(Continued)

OTHER PUBLICATIONS

JP-2013051179-A English machine translation (Year: 2013).*

(Continued)

*Primary Examiner* — Scott J. Chmielecki
(74) *Attorney, Agent, or Firm* — Crowell & Moring LLP

(57) ABSTRACT

An object of the present invention is to provide an electrolytic solution for nonaqueous electrolytic solution batteries capable of showing high output characteristics at low temperature even after the batteries are used to some extent, and a nonaqueous electrolytic solution batteries. The present invention is characterized in the use of an electrolytic solution for nonaqueous electrolytic solution batteries, the electrolytic solution including a difluoro ionic complex (1-Cis) in a cis configuration represented by the general formula (1-Cis), a nonaqueous organic solvent, and a solute. Furthermore, the electrolytic solution may contain a difluoro ionic complex (1-Trans) in a trans configuration or a tetrafluoro ionic complex (5).

(Continued)

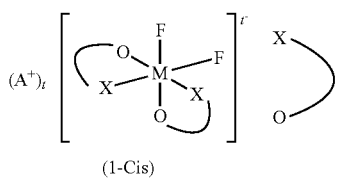

(1-Cis)

wherein in (1-Cis), is

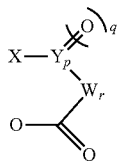

18 Claims, 1 Drawing Sheet

(51) Int. Cl.
H01M 4/48 (2010.01)
H01M 10/0568 (2010.01)
H01M 4/587 (2010.01)
H01M 10/052 (2010.01)
H01M 10/0567 (2010.01)
H01M 10/0569 (2010.01)
H01M 10/0525 (2010.01)

(52) U.S. Cl.
CPC ........... H01M 2/1613 (2013.01); H01M 4/48 (2013.01); H01M 4/587 (2013.01); H01M 10/052 (2013.01); H01M 10/0525 (2013.01); H01M 10/0567 (2013.01); H01M 10/0569 (2013.01); Y02E 60/122 (2013.01); Y02T 10/7011 (2013.01)

(56) References Cited

U.S. PATENT DOCUMENTS

| | | |
|---|---|---|
| 6,652,644 B1 | 11/2003 | Miller et al. |
| 6,693,212 B1 | 2/2004 | Wietelmann et al. |
| 6,783,896 B2 | 8/2004 | Tsujioka et al. |
| 6,919,145 B1 | 7/2005 | Kotato et al. |
| 7,135,252 B2 | 11/2006 | Thackeray et al. |
| 7,416,813 B2 | 8/2008 | Fujihara et al. |
| 7,645,544 B2 | 1/2010 | Ihara et al. |
| 7,771,876 B2 | 8/2010 | Mizutani et al. |
| 8,039,151 B2 | 10/2011 | Inagaki et al. |
| 8,546,018 B2 | 10/2013 | Kajiyama et al. |
| 8,822,084 B2 | 9/2014 | Tsujioka et al. |
| 2002/0081496 A1 | 6/2002 | Tsujioka et al. |
| 2003/0100761 A1 | 5/2003 | Tsujioka et al. |
| 2005/0191553 A1 | 9/2005 | Fujihara et al. |
| 2005/0208378 A1 | 9/2005 | Mizutani et al. |
| 2007/0009798 A1 | 1/2007 | Inagaki et al. |
| 2008/0090154 A1 | 4/2008 | Ihara et al. |
| 2010/0316910 A1 | 12/2010 | Kajiyama et al. |
| 2011/0136019 A1 | 6/2011 | Amiruddin et al. |
| 2011/0236768 A1 | 9/2011 | Tani |
| 2011/0256458 A1 | 10/2011 | Tani |
| 2013/0022880 A1 | 1/2013 | Tsujioka et al. |
| 2013/0071731 A1 | 3/2013 | Tokuda et al. |
| 2013/0183580 A1 | 7/2013 | Kako et al. |
| 2013/0260210 A1* | 10/2013 | Takami ............ H01M 10/0525 429/156 |
| 2013/0288139 A1 | 10/2013 | Choi et al. |
| 2013/0302700 A1 | 11/2013 | Washizuka |
| 2013/0323570 A1 | 12/2013 | Iwanaga |
| 2015/0147643 A1 | 5/2015 | Morinaka et al. |
| 2015/0194671 A1 | 7/2015 | Nakahara et al. |
| 2015/0207142 A1 | 7/2015 | Takijiri et al. |
| 2016/0013517 A1 | 1/2016 | Nakazawa et al. |

FOREIGN PATENT DOCUMENTS

| | | |
|---|---|---|
| CN | 102834962 A | 12/2012 |
| CN | 103208652 A | 7/2013 |
| EP | 3145019 A1 | 3/2017 |
| JP | H05-074486 A | 3/1993 |
| JP | H07-176323 A | 7/1995 |
| JP | H08-45545 A | 2/1996 |
| JP | 2001-006729 A | 1/2001 |
| JP | 2001-057235 A | 2/2001 |
| JP | 2002-110235 A | 4/2002 |
| JP | 2002-151077 A | 5/2002 |
| JP | 2002-519352 A | 7/2002 |
| JP | 2002-329528 A | 11/2002 |
| JP | 2003-7334 A | 1/2003 |
| JP | 2003-505464 A | 2/2003 |
| JP | 2003-115324 A | 4/2003 |
| JP | 2003-137890 A | 5/2003 |
| JP | 3417411 B2 | 6/2003 |
| JP | 3573521 B2 | 10/2004 |
| JP | 2005-005115 A | 1/2005 |
| JP | 3722685 B2 | 11/2005 |
| JP | 2006-196250 A | 7/2006 |
| JP | 2007-018883 A | 1/2007 |
| JP | 2007-035357 A | 2/2007 |
| JP | 3907446 B2 | 4/2007 |
| JP | 2007-242411 A | 9/2007 |
| JP | 2007-335143 A | 12/2007 |
| JP | 2008-004503 A | 1/2008 |
| JP | 2008-016424 A | 1/2008 |
| JP | 2008-270201 A | 11/2008 |
| JP | 4190162 B2 | 12/2008 |
| JP | 2009-137834 A | 6/2009 |
| JP | 2009-245828 A | 10/2009 |
| JP | 4423888 B2 | 3/2010 |
| JP | 4695802 B2 | 6/2011 |
| JP | 2011-222193 A | 11/2011 |
| JP | 2013-030284 A | 2/2013 |
| JP | 2013051179 A * | 3/2013 |
| JP | 5278442 B2 | 9/2013 |
| JP | 2013-232417 A | 11/2013 |
| JP | 5573313 B2 | 8/2014 |
| JP | 2009-176752 A | 9/2015 |
| KR | 10-2013-0006500 | 1/2013 |
| WO | WO 2004/042851 A1 | 2/2004 |
| WO | WO 2004/100293 A1 | 11/2004 |
| WO | WO 2007/083155 A1 | 7/2007 |
| WO | WO 2010/067549 A1 | 6/2010 |
| WO | WO 2011/125397 A1 | 10/2011 |
| WO | WO 2011/142410 A1 | 11/2011 |
| WO | WO 2012/102259 A1 | 8/2012 |
| WO | WO 2012/117911 A1 | 9/2012 |
| WO | WO 2013/118661 A1 | 8/2013 |
| WO | WO 2013/132824 A1 | 9/2013 |
| WO | WO 2013/180174 A1 | 12/2013 |
| WO | WO 2014/034043 A1 | 3/2014 |
| WO | WO 2014/157591 A1 | 10/2014 |
| WO | WO 2015/174455 A1 | 11/2015 |

OTHER PUBLICATIONS

Chinese-language Office Action issued in counterpart Chinese Application No. 201580073996.1 dated Dec. 3, 2018 (13 pages).
"Spectroscopic studies of inorganic fluoro-complexes. Part III. Fluorine-19 nuclear magnetic resonance studies of silicon(IV), germanium(IV), and titanium(IV) fluoro-complexes", Journal of the Chemical Society A, 1970, 15, pp. 2569-2574.
Supplementary European Search Report issued in European Application No. 15878967.7 dated May 23, 2018 (four (4) pages).

(56) References Cited

OTHER PUBLICATIONS

European Office Action issued in counterpart European Application No. 15 878 967.7 dated Jun. 27, 2018 (seven (7) pages).
Korean-language Office Action issued in counterpart Korean Application No. 10-2017-7023175 dated Aug. 21, 2018 (nine (9) pages).
Redel et al., "High-Performance Li-Rich Layered Transition Metal Oxide Cathode Materials for Li-Ion Batteries," Journal of the Electrochemical Society, 2019, pp. A5333-A5342, vol. 166, No. 3 (10 pages).
Zhao et al., "Structural and mechanistic revelations on high capacity cation-disordered Li-rich oxides for rechargeable Li-ion batteries," Energy Storage Materials, 2019, pp. 354-363, vol. 16 (10 pages).
Zhao et al., "Characterization of Li-rich layered oxides by using transmission electron microscope," Green Energy & Environment, 2017, pp. 174-185, vol. 2 (12 pages).
Malik, "Li-Rich Layered Cathode Materials: Transition Metals in Transit," Joule, Dec. 20, 2017, pp. 647-648, vol. 1 (two (2) pages).
Chong et al., "Suppressing capacity fading and voltage decay of Li-rich layered cathode material by a surface nano-protective layer of $CoF_2$ for lithium-ion batteries," Journal of Power Sources, 2016, pp. 230-239, vol. 332 (10 pages).

\* cited by examiner

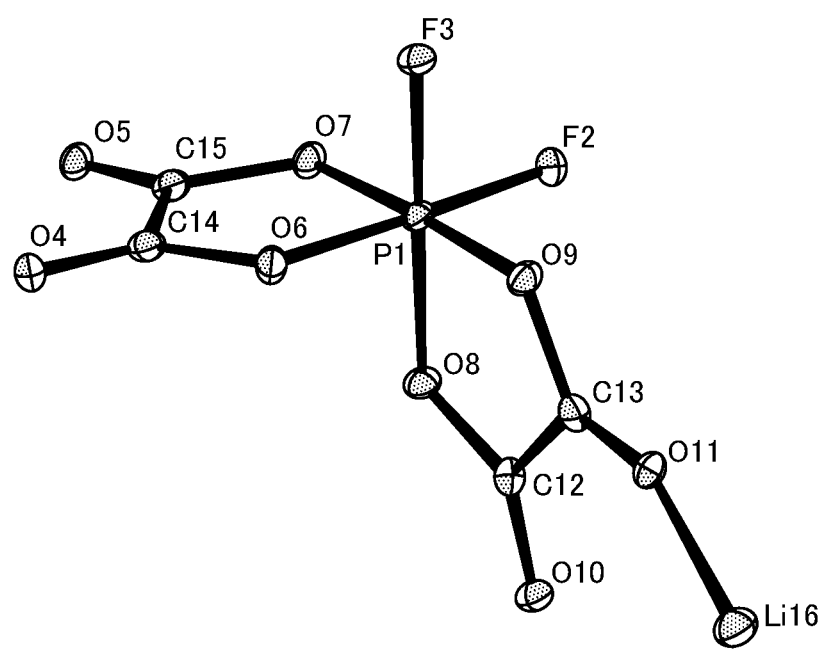

ELECTROLYTIC SOLUTION FOR NONAQUEOUS ELECTROLYTIC SOLUTION SECONDARY BATTERIES AND NONAQUEOUS ELECTROLYTIC SOLUTION SECONDARY BATTERY

TECHNICAL FIELD

The present invention relates to an electrolytic solution used for a nonaqueous electrolytic solution battery such as a lithium ion battery and the nonaqueous electrolytic solution battery.

BACKGROUND ART

In recent years, electricity storage systems have gathered much attention with regard to batteries as electrochemical devices for small-sized and high energy density applications, for example, information-related apparatus, communication apparatus, i.e., personal computers, video cameras, digital cameras, portable telephones, and smartphones; and electricity storage systems for large-sized and high power applications, for example, electric vehicles, hybrid vehicles, auxiliary power systems for fuel cell vehicles, and electric power storage systems. As one of the candidates of such systems, nonaqueous electrolytic solution batteries have been under active development, such as lithium ion batteries, lithium batteries, and lithium ion capacitors.

In the case of lithium ion batteries, a negative electrode may react with lithium cations or an electrolytic solution solvent when lithium cations are intercalated or occluded in the negative electrode at the initial charge. This may result in formation of a film containing lithium oxide, lithium carbonate, and lithium alkylcarbonate as the main components on the surface of the negative electrode. That film on the surface of the electrode which is called Solid Electrolyte Interface (SEI) may, in nature, have significant impact on battery performance. For example, it may reduce reductive decomposition of a solvent to prevent deterioration of battery performance. Further, a film may also be formed on the surface of a positive electrode due to oxidatively decomposed products. This film is also known to play an important role. For example, oxidative decomposition of a solvent may be prevented to reduce the amount of generated battery gas.

In order to improve battery performance, including durability and output characteristics, it is important to form an SEI having a high ion conductivity, a low electron conductivity, and a prolonged stability. To this end, attempts have been widely made for intentionally forming a good SEI by adding a small amount (usually 0.01 mass % or more and 10 mass % or less) of a compound called an additive to an electrolytic solution.

For example, the following additives are used for forming an effective SEI: vinylene carbonate in Patent Document 1; unsaturated cyclic sulfonic acid ester including 1,3-propene sultone in Patent Document 2; carbon dioxide in Patent Document 3; aromatic compounds including 1,2,3,4-tetrahydronaphthalene in Patent Document 4; nitrogen-containing unsaturated compounds including pyridine in Patent Document 5; lithium bis(oxalato)borate in Patent Document 6; and phosphorus-boron complexes including lithium difluoro(oxalato)borate in Patent Document 7. It is noted that Patent Document 8 discloses a method of manufacturing an ionic complex used as an electrolyte for electrochemical devices. Further, Patent Document 9 discloses a method of manufacturing lithium tris(oxalato)phosphate. Moreover, Patent Document 10 discloses an electrolytic solution which can improve a discharge capacity ratio at −20° C./25° C. Furthermore, Nonpatent Document 1 discloses a method of manufacturing fluoro complexes having silicon or the like in the complex center.

Patent Document 1: Japanese Unexamined Patent Application, Publication No. H08-045545 (Japanese Patent No. 3573521)
Patent Document 2: Japanese Unexamined Patent Application, Publication No. 2002-329528 (Japanese Patent No. 4190162)
Patent Document 3: Japanese Unexamined Patent Application, Publication No. H07-176323
Patent Document 4: Japanese Unexamined Patent Application, Publication No. 2003-007334 (Japanese Patent No. 3417411)
Patent Document 5: Japanese Unexamined Patent Application, Publication No. 2003-115324
Patent Document 6: Japanese Unexamined Patent Application, Publication No. 2007-335143
Patent Document 7: Japanese Unexamined Patent Application, Publication No. 2002-110235 (Japanese Patent No. 3722685)
Patent Document 8: Japanese Unexamined Patent Application, Publication No. 2003-137890 (Japanese Patent No. 3907446)
Patent Document 9: Japanese Unexamined Patent Application (Translation of PCT Application), Publication No. 2003-505464 (Japanese Patent No. 4695802)
Patent Document 10: Japanese Unexamined Patent Application, Publication No. 2011-222193 (Japanese Patent No. 5573313)
Non-Patent Document 1: J. Chem. Soc. (A), 1970, 15, 2569-2574

DISCLOSURE OF THE INVENTION

Problems to be Solved by the Invention

Not a small number of practical nonaqueous electrolytic solution batteries, which are typically lithium ion batteries, are already available. Nonetheless, an electrolytic solution having sufficient properties has not yet been obtained for applications where batteries may potentially be used under more harsh environments, including in-vehicle applications.

Specifically, high output characteristics at a low temperature, for example, at 0° C. or less are strongly desired to allow a nonaqueous electrolytic solution battery to operate at a high output without aid of thermal insulation and heating even in cold climate areas. In order to achieve this, various electrolytic solutions have been proposed to date. However, the majority of them remain unsatisfactory in that the output characteristics are significantly decreased after batteries are used to some extent (charge/discharge cycles have been performed for certain times; or storage history at high temperature is long) although the initial output characteristics are improved. Therefore, an electrolytic solution for nonaqueous electrolytic solution batteries is strongly desired which shows high output characteristics at low temperature even after a certain number of charge/discharge cycles or after stored at high temperature.

An object of the present invention is to provide an electrolytic solution for nonaqueous electrolytic solution batteries capable of showing high output characteristics at low temperature even after the batteries are used to some extent, and a nonaqueous electrolytic solution battery.

Means for Solving the Problems

In view of the above circumstances, the present inventors conducted extensive studies about six-coordinate ionic complexes which can be present in their cis- or trans-isomers. After comparing effects of separate addition of cis- or trans-isomer, the present inventors found that a cis-isomer can provide higher output characteristics at low temperature after cycle durability tests.

That is, the present invention can provide an electrolytic solution for nonaqueous electrolytic solution batteries, the electrolytic solution including a difluoro ionic complex (1-Cis) in the cis configuration represented by the general formula (1-Cis), a nonaqueous organic solvent, and a solute.

wherein in (1-Cis),

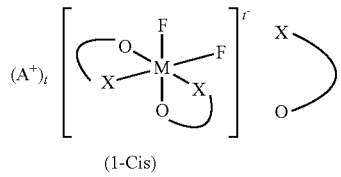

(1-Cis)

is

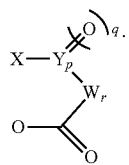

In the general formula (1-Cis), $A^+$ is any one selected from the group consisting of a metal ion, a proton, and an onium ion, and M is any one selected from the group consisting of Si, P, As, and Sb. F is a fluorine atom, and O is an oxygen atom. t is 2 when M is Si, and t is 1 when M is P, As, or Sb. X is an oxygen atom or —N($R^1$)—. N is a nitrogen atom, and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more). When X is —N($R^1$)—, and p is 0, X and W are directly bonded and may form a structure as shown in the general formulas (2) to (4) below. In the case of the general formula (3) below where the direct bond is a double bond, $R^1$ is not present.

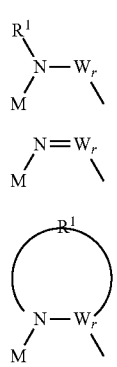

Y is a carbon atom or a sulfur atom. q is 1 when Y is a carbon atom. q is 1 or 2 when Y is a sulfur atom. W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N($R^2$)—. Here, $R^2$ represents a hydrogen atom, an alkaline metal, or a hydrocarbon group having 1 to 10 carbon atoms and optionally having a hetero atom and/or a halogen atom. When the number of carbon atoms is 3 or more, $R^2$ may have a branched-chain or ring structure. p is 0 or 1, and q is an integer of 0 to 2, and r is an integer of 0 to 2, and p+r≥1.

Elements in the anion moiety of the above difluoro ionic complex (1-Cis) are in at least one combination selected from (i), (ii), (iii), or (iv).

$$M=P; X=O; Y=C; p,q, \text{ and } t=1; \text{ and } r=0 \quad \text{(i)}$$

$$M=P; X=O; W=C(CF_3)_2; p \text{ and } q=0; \text{ and } r \text{ and } t=1 \quad \text{(ii)}$$

$$M=Si; X=O; Y=C; p \text{ and } q=1; t=2; \text{ and } r=0 \quad \text{(iii)}$$

$$M=P; X=N(R^1); Y=C; R^1=CH_3; p,q, \text{ and } t=1; \text{ and } r=0 \quad \text{(iv)}$$

The $A^+$ in the difluoro ionic complex (1-Cis) is preferably a lithium ion, a sodium ion, a potassium ion, or a quaternary alkylammonium ion, and the concentration of the difluoro ionic complex (1-Cis) preferably is in the range of 0.001 mass % or more and 20 mass % or less relative to the electrolytic solution for nonaqueous electrolytic solution batteries.

Preferably, the electrolytic solution for nonaqueous electrolytic solution batteries according to the present invention further includes a difluoro ionic complex (1-Trans) in the trans configuration represented by the general formula (1-Trans).

wherein in (1-Trans),

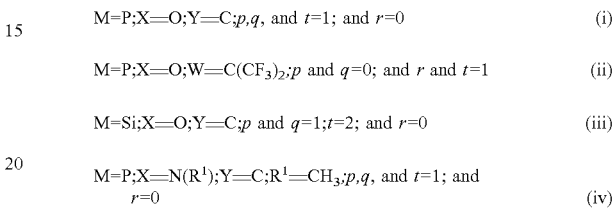

(1-Trans)

is

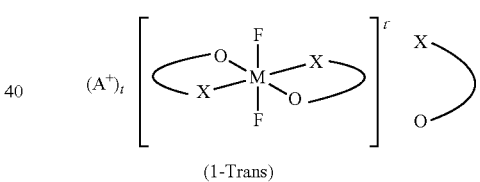

In the general formula (1-Trans), $A^+$ is any one selected from the group consisting of a metal ion, a proton, and an onium ion, and M is any one selected from the group consisting of Si, P, As, and Sb. F is a fluorine atom, and O is an oxygen atom. t is 2 when M is Si, and t is 1 when M is P, As, or Sb. X is an oxygen atom or —N($R^1$)—. N is a nitrogen atom, and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more). When X is —N($R^1$)—, and p is 0, X and W are directly bonded and may form a structure as shown in the general formulas (2) to (4) below. In the case of the general formula (3) below where the direct bond is a double bond, $R^1$ is not present.

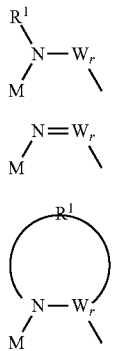

(2)

(3)

(4)

Y is a carbon atom or a sulfur atom. q is 1 when Y is a carbon atom. q is 1 or 2 when Y is a sulfur atom. W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N($R^2$)—. Here, $R^2$ represents a hydrogen atom, an alkaline metal, or a hydrocarbon group having 1 to 10 carbon atoms and optionally having a hetero atom and/or a halogen atom. When the number of carbon atoms is 3 or more, $R^2$ may have a branched-chain or ring structure. p is 0 or 1, and q is an integer of 0 to 2, and r is an integer of 0 to 2, and p+r≥1.

Elements in the anion moiety of the above difluoro ionic complex (1-Trans) are in at least one combination selected from (i), (ii), (iii), or (iv).

M=P;X=O;Y=C;$p,q$, and $t$=1; and $r$=0 (i)

M=P;X=O;W=C(CF$_3$)$_2$;$p$ and $q$=0; and $r$ and $t$=1 (ii)

M=Si;X=O;Y=C;$p$ and $q$=1;$t$=2; and $r$=0 (iii)

M=P;X=N($R^1$);Y=C;$R^1$=CH$_3$;$p,q$, and $t$=1; and $r$=0 (iv)

The $A^+$ in the difluoro ionic complex (1-Trans) is preferably a lithium ion, a sodium ion, a potassium ion, or a quaternary alkylammonium ion, and the ratio of the content of the difluoro ionic complex (1-Trans) relative to the mass of the difluoro ionic complex (1-Cis) is preferably 0.0001 or more and 0.05 or less.

Preferably, the electrolytic solution for nonaqueous electrolytic solution batteries according to the present invention further includes a tetrafluoro ionic complex (5) represented by the general formula (5).

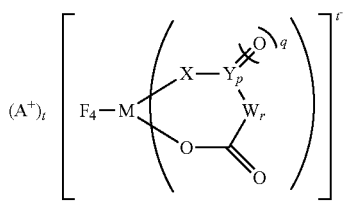

(5)

In the general formula (5), $A^+$ is any one selected from the group consisting of a metal ion, a proton, and an onium ion, and M is any one selected from the group consisting of Si, P, As, and Sb. F is a fluorine atom, and O is an oxygen atom. t is 2 when M is Si, and t is 1 when M is P, As, or Sb. X is an oxygen atom or —N($R^1$)—. N is a nitrogen atom, and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more). When X is —N($R^1$)—, and p is 0, X and W are directly bonded and may form a structure as shown in the general formulas (2) to (4) below. In the case of the general formula (3) below where the direct bond is a double bond, $R^1$ is not present.

(2)

$$R^1\diagdown N\!\!-\!\!W_r\diagup M\diagdown$$

(3)

$$N\!\!=\!\!W_r\diagup M\diagdown$$

(4)

Y is a carbon atom or a sulfur atom. q is 1 when Y is a carbon atom. q is 1 or 2 when Y is sulfur atom. W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N($R^2$)—. Here, $R^2$ represents a hydrogen atom, an alkaline metal, or a hydrocarbon group having 1 to 10 carbon atoms and optionally having a hetero atom and/or a halogen atom. When the number of carbon atoms is 3 or more, $R^2$ may have a branched-chain or ring structure. p is 0 or 1, and q is an integer of 0 to 2, and r is an integer of 0 to 2, and p+r≥1.

Elements in the anion moiety of the tetrafluoro ionic complex (5) are preferably in any combination selected from (i), (ii), (iii), or (iv).

M=P;X=O;Y=C;$p,q$, and $t$=1; and $r$=0 (i)

M=P;X=O;W=C(CF$_3$)$_2$;$p$ and $q$=0; and $r$ and $t$=1 (ii)

M=Si;X=O;Y=C;$p$ and $q$=1;$t$=2; and $r$=0 (iii)

M=P;X=N($R^1$);Y=C;$R^1$=CH$_3$;$p,q$, and $t$=1; and $r$=0 (iv)

The $A^+$ in the tetrafluoro ionic complex (5) is preferably a lithium ion, a sodium ion, a potassium ion, or a quaternary alkylammonium ion, and the ratio of the content of the tetrafluoro ionic complex (5) relative to the mass of the difluoro ionic complex (1-Cis) is preferably 0.02 or more and 0.25 or less.

The aforementioned nonaqueous organic solvent is preferably at least one selected from the group consisting of carbonates, esters, ethers, lactones, nitriles, amides, and sulfones. Further, the nonaqueous organic solvent is preferably at least one selected from the group consisting of ethylmethyl carbonate, dimethyl carbonate, diethyl carbonate, methylpropyl carbonate, ethylpropyl carbonate, methylbutyl carbonate, ethylene carbonate, propylene carbonate, butylene carbonate, methyl acetate, ethyl acetate, methyl propionate, ethyl propionate, diethyl ether, acetonitrile, propionitrile, tetrahydrofuran, 2-methyltetrahydrofuran, furan, tetrahydropyran, 1,3-dioxane, 1,4-dioxane, dibutyl ether, diisopropyl ether, 1,2-dimethoxyethane, N,N-dimethylformamide, dimethyl sulfoxide, sulfolane, γ-butyrolactone, and γ-valerolactone.

Preferably, the nonaqueous organic solvent is selected from the group consisting of cyclic carbonate and chain carbonate, and the cyclic carbonate is at least one selected from the group consisting of ethylene carbonate and propylene carbonate, and the chain carbonate is at least one selected from the group consisting of ethylmethyl carbonate, dimethyl carbonate, diethyl carbonate, and methylpropyl carbonate.

The aforementioned solute is preferably a salt including a pair of a cation and an anion, the cation being at least one selected from the group consisting of lithium, sodium, potassium, and quaternary alkylammonium, and the anion being at least one selected from the group consisting of hexafluorophosphoric acid, tetrafluoroboric acid, perchloric acid, hexafluoroarsenic acid, hexafluoroantimonic acid, trifluoromethanesulfonic acid, bis(trifluoromethanesulfonyl) imide, bis(pentafluoroethanesulfonyl)imide, (trifluoromethanesulfonyl) (pentafluoroethanesulfonyl)imide, bis (fluorosulfonyl)imide, (trifluoromethanesulfonyl) (fluorosulfonyl)imide, (pentafluoroethanesulfonyl) (fluorosulfonyl)imide, tris(trifluoromethanesulfonyl)methide, and bis(difluorophosphonyl)imide.

Further, the nonaqueous electrolytic solution battery according to the present invention preferably includes the present nonaqueous electrolytic solution, a positive electrode, a negative electrode, and a separator.

Further, the present invention includes:
(a) the present nonaqueous electrolytic solution;
(b) a positive electrode including at least one oxide and/or polyanion compound as a positive-electrode active material;
(c) a negative electrode including a negative-electrode active material; and
(d) a separator containing polyolefin or cellulose as the main component,
wherein the positive-electrode active material is at least one selected from the group consisting of (A) a lithium-transition metal composite oxide having a layer structure and containing at least one metal of nickel, manganese, and cobalt, (B) a lithium-manganese composite oxide having the spinel structure, (C) a lithium-containing olivine-type phosphate salt, and (D) a lithium-rich layered transition metal oxide having the stratified rock-salt structure, and the negative-electrode active material is preferably at least one selected from the group consisting of (E) a carbon material having a d value of the lattice plane [002] of 0.340 nm or less as determined by X ray diffraction, (F) a carbon material having a d value of the lattice plane [002] of more than 0.340 nm as determined by X ray diffraction, (G) an oxide of one or more metals selected from Si, Sn, and Al, (H) one or more metals selected from Si, Sn, and Al or an alloy comprising the one or more metals, or an alloy of lithium and the one or more metals or the alloy, and (I) a lithium titanium oxide.

Effects of the Invention

The present invention can provide an electrolytic solution for nonaqueous electrolytic solution batteries capable of showing high output characteristics at low temperature even after the batteries are used to some extent, and a nonaqueous electrolytic solution batteries.

BRIEF DESCRIPTION OF THE DRAWINGS

FIG. 1 shows an ORTEP diagram of (1a-Cis) according to Synthesis Example 1 based on the single crystal X-ray structural analysis.

PREFERRED MODE FOR CARRYING OUT THE INVENTION

1. Electrolytic Solution for Nonaqueous Electrolytic Solution Batteries

The electrolytic solution for nonaqueous electrolytic solution batteries according to the present invention is characterized by containing a nonaqueous organic solvent and a solute, and further containing a difluoro ionic complex (1-Cis) in the cis configuration represented by the general formula (1-Cis).

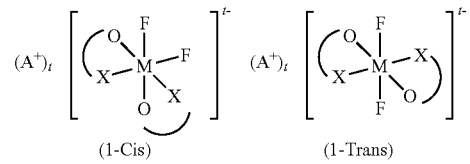

wherein in (1-Cis) and (1-Trans),

is

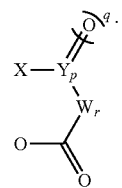

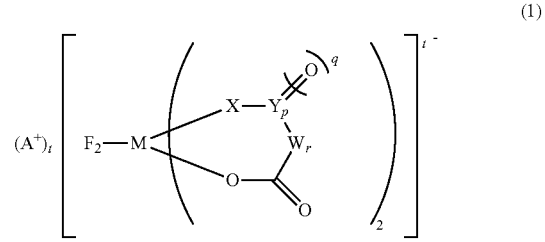

In the general formula (1-Cis) and (1-Trans), $A^+$ is any one selected from the group consisting of a metal ion, a proton, and an onium ion, and M is any one selected from the group consisting of Si, P, As, and Sb. F is a fluorine atom, and O is an oxygen atom. t is 2 when M is Si, and t is 1 when M is P, As, or Sb. X is an oxygen atom or —N(R$^1$)—. N is a nitrogen atom, and R$^1$ is a hydrocarbon group having 1 to 10 carbon atoms and optionally having a hetero atom and/or a halogen atom (the hydrocarbon group optionally having a branched-chain or ring structure when the number of carbon atoms is 3 or more). When X is —N(R$^1$)—, and p is 0, X and W are directly bonded and may form a structure as shown in the general formulas (2) to (4) below. In the general formula (3) below where the direct bond is a double bond, R$^2$ is not present.

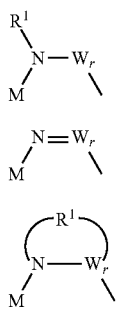

Y is a carbon atom or a sulfur atom. q is 1 when Y is a carbon atom. q is 1 or 2 when Y is a sulfur atom. W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N(R$^2$)—. Here, R$^2$ represents a hydrogen atom, an alkaline metal, or a hydrocarbon group having 1 to 10 carbon atoms and optionally having a hetero atom and/or a halogen atom. R$^2$ may have a branched-chain or ring structure when the number of carbon atoms is 3 or more. Alkaline metals which can be used for R$_2$ include lithium. P is 0 or 1, and q is an integer of 0 to 2, and r is an integer of 0 to 2, and p+r≥1.

It is noted that the ligand (—X . . . O—) of the difluoro ionic complex (1-Trans) may have the same structure as that of the difluoro ionic complex (1-Cis), or may have a different structure.

The difluoro ionic complex (1) is a six-coordinate complex in which bidentate ligands are bidentately coordinated to the central element M, and fluorine (hereinafter, referred to as F) is further bidentately coordinated. A complex in which a ligand is coordinated to the central element M (Si, P, As, Sb) through oxygen or nitrogen is stable, and very slowly undergoes isomerization due to exchange of the ligand in the absence of a catalyst. This can allow for separation of two conformational isomers: a cis isomer (1-Cis) in which two fluorine atoms are bonded in the same side when viewed from the central element and a trans isomer (1-Trans) in which they are bonded in the opposite sides.

A cis/trans mixture will be obtained when concentrating a reaction liquid of the difluoro ionic complex (1) obtained after excessively promoting the reaction under a modified version of the conditions described in Patent Document 8, or a reaction liquid of the difluoro ionic complex (1) obtained by fluorinating a three-molecule coordination product synthesized in accordance with Patent Document 9. When the mixture are repeatedly crystallized in a mixed solvent of a carbonate ester and a chlorinated solvent (both in the filtrate and the mother liquor), (1-Cis) and (1-Trans) each with a purity of 99.9 mol % or more can be obtained separately. Further, (1-Cis) and (1-Trans) may be each obtained by selective synthesis. (1-Cis) and (1-Trans) each preferably have a purity of 95 mol % or more, more preferably 98 mol % or more, and even more preferably 99 mol % or more.

A difluoro ionic complex to be added to the electrolytic solution for nonaqueous electrolytic solution batteries according to the present invention is not a mixture of the equal amount of cis/trans, but the percentage of (1-Cis) in the difluoro ionic complex to be included in the electrolytic solution for nonaqueous electrolytic solution batteries is preferably 95 mol % or more. That is, the mass ratio (1-Trans)/(1-Cis) of (1-Trans) to (1-Cis) is preferably 0.05 or less even when (1-Trans) is included in the electrolytic solution for nonaqueous electrolytic solution batteries.

Elements in the difluoro ionic complex (1) are preferably in any of the following combinations selected from (i) to (iv) below.

M=P;X=O;Y=C;p,q, and t=1; and r=0 (i)

M=P;X=O;W=C(CF$_3$)$_2$;p and q=0; and r and t=1 (ii)

M=Si;X=O;Y=C;p and q=1;t=2; and r=0 (iii)

M=P;X=N(R$^1$);Y=C;R$^1$=CH$_3$;p,q, and t=1; and r=0 (iv)

Further, there is no particular limitation for A$^+$ as a cation of the difluoro ionic complex (1) as long as it does not impair the performance of the electrolytic solution for nonaqueous electrolytic solution batteries and the nonaqueous electrolytic solution battery according to the present invention, but a lithium ion, a sodium ion, a potassium ion, or a quaternary alkylammonium ion is preferred in view of helping ionic conductance in a nonaqueous electrolytic solution battery. There is no particular limitation for the quaternary alkylammonium ion, but examples include trimethylpropylammonium and 1-butyl-1-methylpyrrolidinium.

In particular, the difluoro ionic complex (1) preferably has a structure having elements in any of the following combinations.

A=Li;M=P;X=O;Y=C;p,q, and t=1; and r=0 (1a):

A=Li;M=P;X=O;W=C(CF$_3$)$_2$;p and q=0; and r and t=1 (1b):

A=Li;M=Si;X=O;Y=C;p and q=1;t=2; and r=0 (1c):

A=Li;M=P;X=N(R$^1$);Y=C;R$^1$=CH$_3$;p,q, and t=1; and r=0 (1d):

For example, the difluoro ionic complexes (1a-Cis) and (1a-Trans) in which A=Li; M=P; X=O; Y=C; p, q, and t=1; and r=0 are not readily isomerized under neutral conditions. The ratio of (1a-Cis) and (1a-Trans) does not change at 40° C. after 4 hours in solutions of ethylmethyl carbonate where (1a-Cis) and (1a-Trans) are mixed in 1:9 or 5:5.

The electrolytic solution for nonaqueous electrolytic solution batteries according to the present invention is characterized by containing a solute (main electrolyte), a nonaqueous solvent or a polymer mixture, and one or more ionic complexes selected from the cis-coordinated ionic complexes represented by the general formula (1-Cis) in an amount of 0.001 mass % or more and 20.0 mass % or less relative to the nonaqueous electrolytic solution. Inclusion of (1-Cis) can significantly improve output characteristics (in particular, output characteristics at low temperature after charge and discharge are repeated). The content of (1-Cis) in the electrolytic solution for nonaqueous electrolytic solution batteries is preferably 0.01 mass % or more and 10.0 mass % or less. More preferably, the content is 0.1 mass % or more and 3.0 mass % or less. A content of less than 0.001 mass % may result in an insufficient effect for improving output characteristics of a nonaqueous electrolytic solution battery at low temperature. On the other hand, a content of more than 20.0 mass % may excessively increase the viscosity of an electrolytic solution to interfere with movement of cations in a nonaqueous electrolytic solution battery, resulting in decreased battery performance.

Further, output characteristics at low temperature after storage at high temperature can be improved by adding a certain amount of (1-Trans) relative to (1-Cis). At this time, the ratio of (1-Trans) is 0.0001 or more and 0.05 or less by the mass ratio relative to (1-Cis), preferably 0.001 or more and 0.03 or less, and more preferably 0.002 or more and 0.01 or less.

In the present invention, methods of quantifying the mass ratio (1-Trans)/(1-Cis) of (1-Trans) to (1-Cis) in an electrolytic solution include NMR analysis, liquid chromatography-mass spectrometry (LC-MS), and the like. In NMR analysis, (1-Trans) and (1-Cis) each have a peak in different positions in NMR, and thus the mass ratio can be quantified by measuring the areas of their identified peaks.

In LC-MS, the peaks of (1-Trans) and (1-Cis) can be separated using a column, and thus the mass ratio can be quantified by measuring their peak areas.

Further, when the tetrafluoro ionic complex (5) having tetradentate F atoms is added to an electrolytic solution for nonaqueous electrolytic solution batteries containing (1-Cis) or (1-Cis)+(1-Trans), an increase in the pressure inside a container can be reduced during storage (before cell assembly). At this time, the ratio of (5) by the mass ratio to (1-Cis) is 0.02 or more and 0.25 or less, preferably 0.05 or more and 0.22 or less, and more preferably 0.07 or more and 0.20 or less.

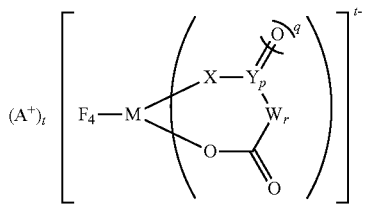

(5)

Elements in the tetrafluoro ionic complex (5) are preferably in any of the combinations of elements selected from (i) to (iv) below.

$M=P; X=O; Y=C; p, q,$ and $t=1;$ and $r=0$     (i)

$M=P; X=O; W=C(CF_3)_2; p$ and $q=0;$ and $r$ and $t=1$     (ii)

$M=Si; X=O; Y=C; p$ and $q=1; t=2;$ and $r=0$     (iii)

$M=P; X=N(R^1); Y=C; R^1=CH_3; p, q,$ and $t=1;$ and $r=0$     (iv)

It is noted that the ligand of the tetrafluoro ionic complex (5), ($-X-Y_p(=O)_q-W_r-C(=O)-O-$), may have the same structure as that of the difluoro ionic complex (1-cis), or may have a different structure.

Further, there is no particular limitation for $A^+$ as a cation of the tetrafluoro ionic complex (5) as long as it does not impair the performance of the electrolytic solution for nonaqueous electrolytic solution batteries and the nonaqueous electrolytic solution battery according to the present invention, but a lithium ion, a sodium ion, a potassium ion, or a quaternary alkylammonium ion is preferred in view of helping ionic conductance in a nonaqueous electrolytic solution battery. There is no particular limitation for the quaternary alkylammonium ion, but examples include trimethylpropylammonium and 1-butyl-1-methylpyrrolidinium.

It is noted that the ionic complex (5) can improve the discharge capacity ratio of −20° C./25° C. when an electrolytic solution including both (5a) and (1a) where A=Li; M=P; X=O; Y=C; p, q, and t=1; and r=0 is used. Further, the tetrafluoro ionic complex (5) does not have conformational isomers.

Although a six-coordinate ionic complex having two types of ligands (one of them is F) which can be present as its cis- or trans-isomer as shown in (1) has been used as described in Patent Document 7, the effects of the cis isomer alone and the trans isomer alone have not closely studied separately. In the present application, a cis isomer alone or a trans isomer alone was separately added to compare their individual effects. Results revealed that the cis isomer showed a better effect for improving output characteristics at low temperature after cycle durability tests.

When voltage is applied to an electrolytic solution for nonaqueous electrolytic solution batteries containing a difluorophosphate complex having P as the central element M selected from the difluoro ionic complexes (1), the difluorophosphate complex is reductively decomposed to generate a reduction-reaction decomposition product (intermediate) with a very short life time in the system. It may react with a functional group present on the surface of a negative electrode to form a SEI on the negative electrode. The SEI mainly includes a derivative of difluorophosphoric acid and a derivative of carbonic acid.

Reduction-reaction decomposition products from reduction reactions are likely different between the cis isomer and the trans isomer due to steric and electronic factors, resulting in different selectivities and rates for a reaction with a functional group on the surface of an electrode. First, steric factors will be discussed with regard to the initiation of a reduction reaction between a negative electrode and difluorophosphate complexes (cis, trans). A difluorophosphate complex receives an electron from a negative electrode at a portion of a ligand other than F (for example, a carbon atom on the carbonyl group in the case of 1a) where the reduction reaction is initiated. Accordingly, the electron needs to approach the negative electrode from a side where F is not bonded to initiate the reduction reaction. The trans isomer has F atoms bonded at the upper and lower sides of the molecule. Consequently, the reduction reaction is initiated only when an electron approaches an electrode from either right or left, i.e., from a range of total 180° in the horizontal direction except for 180° in the vertical direction. In contrast, the cis isomer has F atoms only in the same side, and thus an electron can approach from a range of 200° to 250° in the opposite side. This increases the probability of initiation of the reduction reaction as compared with the trans isomer.

Next, electronic factors will be discussed. The LUMO level is slightly lower for the cis isomer than for the trans isomer. Therefore, the cis isomer more readily receives an electron from an electrode, leading to a more rapidly proceeding reduction reaction.

Further, the difluorophosphate complex before decomposition is a six-coordinate phosphorus compound while the difluoro phosphoric acid derivative as the main component of SEI after decomposition is a five-coordinate phosphorus compound. It undergoes transform from six-coordination to five-coordination when the difluorophosphate complex decomposes to generate a highly active intermediate, and the intermediate reacts with a functional group on the surface of a negative electrode. For the trans isomer, the bond angle of F—P—F before decomposition (six-coordination) is 180° while the bond angle of F—P—F after decomposition (five-coordination) is about 100°. Therefore, a large structural change is required. On the other hand, the cis isomer shows only a small change of from 90° (six-coordination, before decomposition) to about 100° (five-coordination, after decomposition). As clearly understood from the above, the energy required for the transition state of the reductive decomposition reaction is smaller in the cis isomer without a large structural change, and thus the reductive decomposition of the cis isomer is more favored than that of the trans isomer. This is not limited to a complex having phosphorus as the central element, but also can be applied to arsenic, antimony, and silicon.

Considering that the reductive decomposition reaction proceeds in different rates between the cis isomer and the trans isomer, the difference in the performance of SEI formed therefrom will be discussed.

The reductive decomposition reaction rapidly proceeds in the cis isomer to rapidly form an SEI which mainly contains a derivative of difluorophosphoric acid and a derivative of carbonic acid. To date, it has been revealed that an SEI consisting of a derivative of difluorophosphoric acid has an excellent effect for improving the cycle characteristics, high-temperature storage properties, and output characteristics of a battery while an SEI consisting of a derivative of carbonic acid has an excellent effect for improving the cycle characteristics and high-temperature storage properties. The reductive decomposition reaction of the trans isomer is slower as compared with that of the cis isomer, and thus prompt formation of an SEI consisting only of a derivative of difluorophosphoric acid and a derivative of carbonic acid is difficult to obtain. Due to this, the reduction reaction of a solvent also proceeds concomitantly with it, resulting in formation of an SEI mainly containing a mixture of a derivative of difluorophosphoric acid and a derivative of carbonic acid from the difluorophosphate complex, and carbonic acid and an alkyl carbonate salt from a solvent. (The difluorophosphate complex is much more susceptible to decomposition than a solvent, but the number of solvent molecules is enormously large, and thus decomposition of a solvent also proceeds although it is very little.) An SEI consisting of an alkyl carbonate salt included therein can improve cycle characteristics and high-temperature storage properties, but may decrease cation conductivity as compared with an SEI consisting of a derivative of carbonic acid due to a reduced ratio of oxygen. Therefore, output characteristics may be improved only marginally, or may even be decreased.

As described above, the different rates of the reductive decomposition reaction between the cis isomer and the trans isomer may alter the selectivity of the reductive decomposition reaction (the presence or absence of solvent decomposition), resulting in different main components in SEIs formed therefrom. This is likely responsible for the difference in the effects of SEIs for improving the battery performance in the end.

As described above, output characteristics at low temperature after high-temperature storage can be improved by adding (1-Trans) in a certain amount relative to (1-Cis). The reasons of this will be discussed similarly in terms of the different properties of SEIs between the cis isomer and the trans isomer. In a lithium battery, lithium is gradually released from a negative electrode in a fully charged condition to react with a solvent during high-temperature storage as oxidative decomposition of the solvent proceeds on the surface of a positive electrode maintained at a high potential. Due to this, highly resistive decomposition products accumulate on the positive and negative electrodes. Further, reversibly available lithium is decreased, resulting in decreased battery performance (the charge-and-discharge rate and capacity are decreased). A negative-electrode SEI consisting of an alkyl carbonate salt has a low ionic conductivity, and thus is disadvantageous for output characteristics. However, it can reduce the release of lithium from the negative electrode during high-temperature storage to prevent a decreased capacity after high-temperature storage. As a result, a high capacity is maintained after high-temperature storage. When high-rate discharge capacities (output characteristics) at low temperature are compared after high-temperature storage, the amount of electricity obtained at high-rate discharge as compared with low-rate discharge is lower as compared with an electrolytic solution of (1-Cis) only. However, the absolute values of the amount of electricity obtained at high-rate discharge is higher for an electrolytic solution having a certain amount of (1-Trans) relative to (1-Cis) than an electrolytic solution having (1-Cis) only because the starting capacity is higher.

In the tetrafluoro ionic complex (5) having tetradentate F atoms, a ligand other than F has lower electron density as compared with the difluoro ionic complex (1) having bidentate F atoms because of the strong electron-withdrawing effect of F. This makes the ligand more susceptible to a nucleophilic attack. Therefore, if a trace amount of water is present in an electrolytic solution, (5) is selectively hydrolyzed instead of (1). For example, when the central element M is P, the moiety of tetrafluorophosphoric acid of (5) is converted into a salt of hexafluorophosphoric acid by hydrolysis (a ligand other than F is disproportioned after leaving). The ligand moiety other than F leaves from the central element P, and is decomposed to release carbon dioxide and carbon monoxide. The amount of carbon dioxide and carbon monoxide released at this time is ½ mol equivalent relative to (1). This can significantly reduce the yield of carbon dioxide and carbon monoxide which otherwise may increase the internal pressure.

In general, an electrolytic solution for nonaqueous electrolytic solution batteries is called a nonaqueous electrolyte when a nonaqueous solvent is used, and called a polymeric solid electrolytic solution when a polymer is used. Polymeric solid electrolytes include those containing a nonaqueous solvent as a plasticizing agent. It is noted that an electrochemical device is referred to as a nonaqueous electrolytic solution battery, the device including the present electrolytic solution for nonaqueous electrolytic solution batteries; a negative-electrode active material which can occlude and release an alkali metal ion such as a lithium ion and a sodium ion or an alkaline earth metal ion; and a positive-electrode active material which can occlude and release an alkali metal ion such as a lithium ion and a sodium ion or an alkaline earth metal ion.

There is no particular limitation for the solute, and salts of any cations and any anions can be used. As specific examples, cations include alkali metal ions such as a lithium ion and a sodium ion; alkaline earth metal ions; quaternary alkylammonium ions; and the like. Anions include anions of hexafluorophosphoric acid, tetrafluoroboric acid, perchloric acid, hexafluoroarsenic acid, hexafluoroantimonic acid, trifluoromethanesulfonic acid, bis(trifluoromethanesulfonyl) imide, bis(pentafluoroethanesulfonyl)imide, (trifluoromethanesulfonyl) (pentafluoroethanesulfonyl)imide, bis(fluorosulfonyl)imide, (trifluoromethanesulfonyl)(fluorosulfonyl)imide, (pentafluoroethanesulfonyl) (fluorosulfonyl)imide, tris (trifluoromethanesulfonyl)methide, bis(difluorophosphonyl)imide, and the like. These solutes may be used alone, or may be used in a mixture in any combination or ratio of two or more depending on applications. Among these, lithium, sodium, magnesium, and quaternary alkylammonium are preferred as cations, and hexafluorophosphoric acid, tetrafluoroboric acid, bis(trifluoromethane sulfonyl)imide, bis(fluorosulfonyl)imide, and bis(difluoro phosphonyl)imide are preferred as anions in view of energy density, output characteristics, lifetime, and the like of a battery.

There is no particular limitation for the nonaqueous solvent as long as it is an aprotic solvent in which the ionic complex according to the present invention can be dissolved. For example, carbonates, esters, ethers, lactones, nitriles, amides, sulfones, and the like can be used. Further, they may be used alone or as a mixed solvent of two or more. Specific examples can include ethylmethyl carbonate, dimethyl carbonate, diethyl carbonate, methylpropyl carbonate, ethylpropyl carbonate, methylbutyl carbonate, ethylene carbonate, propylene carbonate, butylene carbonate, methyl acetate, ethyl acetate, methyl propionate, ethyl propionate, diethyl ether, acetonitrile, propionitrile, tetrahydrofuran, 2-methyltetrahydrofuran, furan, tetrahydropyran, 1,3-dioxane, 1,4-dioxane, dibutyl ether, diisopropyl ether, 1,2-dimethoxyethane, N,N-dimethylformamide, dimethyl sulfoxide, sulfolane, γ-butyrolactone, γ-valerolactone, and the like.

Further, the nonaqueous solvent preferably contains at least one selected from the group consisting of cyclic carbonates and chain carbonates. Examples of cyclic carbonates can include ethylene carbonate and propylene carbonate, and examples of chain carbonates can include ethylmethyl carbonate, dimethyl carbonate, diethyl carbonate, and methylpropyl carbonate.

There is no particular limitation for the polymer which can be used to obtain a polymeric solid electrolyte including the ionic complex according to the present invention as long as it is an aprotic polymer in which the aforementioned ionic complexes and the aforementioned solute can be solved. Examples can include polymers having polyethylene oxide in their main chains or side chains, homopolymers or copolymers of polyvinylidene fluoride, methacrylate ester polymers, polyacrylonitrile, and the like. When a plasticizing agent is added to these polymers, the above aprotic nonaqueous solvents may be used.

In the present invention, there is no particular limitation for the concentration of a solute in these ion conductors, but the lower limit is preferably 0.5 mol/L or more, more preferably 0.7 mol/L or more, and even more preferably 0.9 mol/L or more, and the upper limit is 5.0 mol/L or less, preferably 4.0 mol/L or less, and more preferably 2.0 mol/L or less. A concentration of less than 0.5 mol/L may decrease cycle characteristics and output characteristics of a nonaqueous electrolytic solution battery due to decreased ion conductivity. On the other hand, a concentration of more than 5.0 mol/L may increase the viscosity of an electrolytic solution for nonaqueous electrolytic solution batteries, decreasing cycle characteristics and output characteristics of a nonaqueous electrolytic solution battery again due to decreased ion conductivity.

Further, a common additive may be added in any ratio to the electrolytic solution for nonaqueous electrolytic solution batteries according to the present invention unless the spirit of the present invention is impaired. Specific examples can include compounds having effects for preventing overcharging, for forming a film on a negative-electrode, and for protecting a positive electrode such as cyclohexylbenzene, biphenyl, tert-butylbenzene, vinylene carbonate, vinylethylene carbonate, ethynylethylene carbonate, tert-amylbenzene, biphenyl, o-terphenyl, 4-fluorobiphenyl, fluorobenzene, 2,4-difluorobenzene, difluoroanisole, fluoroethylene carbonate, propanesultone, 1,3-propenesultone, dimethylvinylene carbonate, methylenemethane disulfonate, dimethylenemethane disulfonate, and trimethylenemethane disulfonate. Further, the electrolytic solution for nonaqueous electrolytic solution batteries can be used after solidified with a gelatinizing agent or a crosslinked polymer as used in a nonaqueous electrolytic solution battery called a polymer battery.

2. Nonaqueous Electrolytic Solution Battery

The nonaqueous electrolytic solution battery according to the present invention includes (a) the present nonaqueous electrolytic solution, (b) a positive electrode, (c) a negative electrode, and (d) a separator.

[(a) Present Nonaqueous Electrolytic Solution

The nonaqueous electrolytic solution battery according to the present invention includes the nonaqueous electrolytic solution as described in 1. Nonaqueous electrolytic solution.

[(b) Positive Electrode]

(b) the positive electrode preferably includes at least one oxide and/or polyanion compound as a positive-electrode active material.

[Positive-Electrode Active Material]

For a lithium-ion secondary battery in which cations in an nonaqueous electrolytic solution are mostly lithium ions, there is no particular limitation for (b) the positive-electrode active material for a positive electrode as long as it is capable of charge and discharge, but examples of it include at least one selected from the group consisting of (A) a lithium-transition metal composite oxide having a layer structure and containing at least one metal of nickel, manganese, and cobalt; (B) a lithium-manganese composite oxide having the spinel structure; (C) a lithium-containing olivine-type phosphate salt; and (D) a lithium-rich layered transition metal oxide having the stratified rock-salt structure.

((A) Lithium-Transition Metal Composite Oxide)

Examples of (A) the lithium-transition metal composite oxide having a layer structure and containing at least one metal of nickel, manganese, and cobalt as a positive-electrode active material include, for example, lithium-cobalt composite oxides, lithium-nickel composite oxides, lithium-nickel-cobalt composite oxides, lithium-nickel-cobalt-aluminum composite oxides, lithium-cobalt-manganese composite oxides, lithium-nickel-manganese composite oxides, lithium-nickel-manganese-cobalt composite oxides, and the like. Those in which some of the main transition metal atoms of these lithium-transition metal composite oxides are replaced with other elements such as Al, Ti, V, Cr, Fe, Cu, Zn, Mg, Ga, Zr, Si, B, Ba, Y, and Sn can also be used.

Specific examples of lithium-cobalt composite oxides and lithium-nickel composite oxides can include $LiCoO_2$, $LiNiO_2$, and lithium cobalt oxides having a hetero element such as Mg, Zr, Al, and Ti ($LiCo_{0.98}Mg_{0.01}Zr_{0.01}O_2$, $LiCo_{0.98}Mg_{0.01}Al_{0.01}O_2$, $LiCo_{0.975}Mg_{0.01}Zr_{0.005}Al_{0.01}O_2$, and the like). Lithium cobalt oxides having a rare earth compound adhered on the surface as described in WO2014/034043 may also be used. Further, those in which a portion of the particle surface of $LiCoO_2$ particulate powder is coated with aluminum oxide as described in Japanese Unexamined Patent Application, Publication No. 2002-151077 and others may be used.

Lithium-nickel-cobalt composite oxides and lithium-nickel-cobalt-aluminum composite oxides may be represented by the general formula (1-1).

$$Li_aNi_{1-b-c}Co_bM^1_cO_2 \quad (1\text{-}1)$$

In the formula (1-1), $M^1$ is at least one element selected from Al, Fe, Mg, Zr, Ti, and B, and a is $0.9 \leq a \leq 1.2$, and b and c satisfy the requirements of $0.1 \leq b \leq 0.3$ and $0 \leq c \leq 0.1$, respectively.

These can be prepared in accordance with, for example, the method of manufacture as described in Japanese Unexamined Patent Application, Publication No. 2009-137834 and others. Specific examples include $LiNi_{0.8}Co_{0.2}O_2$, $LiNi_{0.85}Co_{0.10}Al_{0.05}O_2$, $LiNi_{0.87}Co_{0.10}Al_{0.03}O_2$, $LiNi_{0.6}Co_{0.3}Al_{0.1}O_2$, and the like.

Specific examples of lithium-cobalt-manganese composite oxides and lithium-nickel-manganese composite oxides include $LiNi_{0.5}Mn_{0.5}O_2$, $LiCo_{0.5}Mn_{0.5}O_2$, and the like.

Lithium-nickel-manganese-cobalt composite oxides include lithium-containing composite represented by the general formula (1-2).

$$Li_dNi_eMn_fCo_gM^2_hO_2 \quad (1\text{-}2)$$

In the formula (1-2), $M^2$ is at least one element selected from Al, Fe, Mg, Zr, Ti, B, and Sn, and d is $0.9 \leq d \leq 1.2$, and e, f, g, and h satisfy the requirements of $e+f+g+h=1$, $0 \leq e \leq 0.7$, $0 \leq f \leq 0.5$, $0 \leq g \leq 0.5$, and $h \geq 0$.

Preferred are lithium-nickel-manganese-cobalt composite oxides containing manganese in the range specified in the general formula (1-2) in order to improve structural stability and high-temperature safety of a lithium secondary battery. In particular, more preferred is those further containing cobalt in the range specified in the general formula (1-2) in order to improve high-rate properties of a lithium-ion secondary battery.

Specific examples include $Li[Ni_{1/3}Mn_{1/3}Co_{1/3}]O_2$, $Li[Ni_{0.45}Mn_{0.35}Co_{0.2}]O_2$, $Li[Ni_{0.5}Mn_{0.3}Co_{0.2}]O_2$, $Li[Ni_{0.6}Mn_{0.2}Co_{0.2}]O_2$, $Li[Ni_{0.49}Mn_{0.3}Co_{0.2}Zr_{0.01}]O_2$, $Li[Ni_{0.49}Mn_{0.3}Co_{0.2}Mg_{0.01}]O_2$, and the like, which have a charge-discharge range, for example, at 4.3 V or above.

((B) Lithium-Manganese Composite Oxide Having the Spinel Structure)

Examples of (B) the lithium-manganese composite oxide having the spinel structure as a positive-electrode active material include, for example, a spinel-type lithium-manganese composite oxide represented by the general formula (1-3).

$$Li_j(Mn_{2-k}M^3_k)O_4 \quad (1\text{-}3)$$

In the formula (1-3), $M^3$ is at least one metal element selected from Ni, Co, Fe, Mg, Cr, Cu, Al, and Ti, and j is $1.05 \leq j \leq 1.15$, and k is 0 k 0.20.

Specific examples include $LiMn_2O_4$, $LiMn_{1.95}Al_{0.05}O_4$, $LiMn_{1.9}Al_{0.1}O_4$, $LiMn_{1.9}Ni_{0.1}O_4$, and $LiMn_{1.5}Ni_{0.5}O_4$, and the like.

((C) Lithium-Containing Olivine-Type Phosphate Salt)

Examples of (C) the lithium-containing olivine-type phosphate salt as a positive-electrode active material include, for example, those represented by the general formula (1-4).

$$LiFe_{1-n}M^4_nPO_4 \quad (1\text{-}4)$$

In the formula (1-4), $M^4$ is at least one selected from Co, Ni, Mn, Cu, Zn, Nb, Mg, Al, Ti, W, Zr, and Cd, and n is $0 \leq n \leq 1$.

Specific example include $LiFePO_4$, $LiCoPO_4$, $LiNiPO_4$, $LiMnPO_4$, and the like. Among these, $LiFePO_4$ and/or $LiMnPO_4$ are preferred.

((D) Lithium-Rich Layered Transition-Metal Oxide)

Examples of (D) the lithium-rich layered transition-metal oxide having the stratified rock-salt structure as a positive-electrode active material include, for example, those represented by the general formula (1-5).

$$xLiM^5O_2.(1-x)Li_2M^6O_3 \quad (1\text{-}5)$$

In the formula (1-5), x is a number satisfying $0<x<1$, and $M^5$ is at least one metal element having a mean oxidation number of $3^+$, and $M^6$ is at least one metal element having a mean oxidation number of $4^+$. In the formula (1-5), $M^5$ is at least one metal element selected from Mn, Ni, Co, Fe, V, and Cr preferably having a valence of 3. That valence may be a mean oxidation number of 3 where a metal with a valence of 2 and a metal with a valence of 4 are used in the equivalent amount.

Further, in the formula (1-5), $M^6$ is preferably one or more metal elements selected from Mn, Zr, and Ti. Specific examples include $0.5[LiNi_{0.5}Mn_{0.5}O_2].0.5[Li_2MnO_3]$, $0.5[LiNi_{1/3}Co_{1/3}Mn_{1/3}O_2].0.5[Li_2MnO_3]$, $0.5[LiNi_{0.375}Co_{0.25}Mn_{0.375}O_2].0.5[Li_2MnO_3]$, $0.5[LiNi_{0.375}Co_{0.125}Fe_{0.125}Mn_{0.375}O_2].0.5[Li_2MnO_3]$, $0.45[LiNi_{0.375}Co_{0.25}Mn_{0.375}O_2].0.10[Li_2TiO_3].0.45[Li_2MnO_3]$, and the like.

The positive-electrode active material (D) represented by the general formula (1-5) is known to have a high capacity in high-voltage charging at 4.4 V or more (in terms of Li) (for example, see U.S. Pat. No. 7,135,252).

These positive-electrode active materials can be prepared in accordance with the methods of manufacture and others described in, for example Japanese Unexamined Patent Application, Publication No. 2008-270201, WO2013/118661, Japanese Unexamined Patent Application, Publication No. 2013-030284, and the like.

The positive-electrode active material needs to contain at least one selected from (A) to (D) described above as the main component. Examples of other additives which may be added include, for example, transition element chalcogenides such as $FeS_2$, $TiS_2$, $V_2O_5$, $MoO_3$, and $MoS_2$; or electrically conductive polymers such as polyacethylene, poly(p-phenylene), polyaniline, and polypyrrole; activated carbon; radical-generating polymers; carbon materials; and the like.

[Positive-Electrode Current Collector]

(b) The positive electrode has a positive-electrode current collector. As the positive-electrode current collector, for example, aluminum, stainless steel, nickel, titanium, or alloys thereof can be used.

[Positive-Electrode Active-Material Layer]

In (b) the positive electrode, for example, a positive-electrode active-material layer is formed on at least one surface of the positive-electrode current collector. The positive-electrode active-material layer includes, for example, the aforementioned positive-electrode active material, a binding agent, and, if desired, an electrically conductive agent.

Examples of the binding agent include polytetrafluoroethylene, poly(vinylidene fluoride), a styrene-butadiene rubber (SBR) resin, or the like.

As the electrically conductive agent, for example, carbon materials can be used such as acetylene black, Ketjen black, carbon fiber, or graphite (granular graphite and flaky graphite). Acetylene black and Ketjen black with low crystallinity are preferably used for the positive electrode.

[(c) Negative Electrode]

(c) The negative electrode includes a negative-electrode active material.

[Negative-Electrode Active Material]

For a lithium-ion secondary battery in which cations in an nonaqueous electrolytic solution are mostly lithium ions, examples of the negative-electrode active material of (c) the negative electrode include, for example, those capable of doping/de-doping lithium ions which contain, for example, at least one selected from (E) a carbon material having a d value of the lattice plane [002] of 0.340 nm or less as determined by X ray diffraction; (F) a carbon material having a d value of the lattice plane [002] of more than 0.340 nm as determined by X ray diffraction; (G) an oxide of one or more metals selected from Si, Sn, and Al; (H) one or more metals selected from Si, Sn, and Al or an alloy comprising the one or more metals, or an alloy of lithium and the one or more metals or the alloy; (I) a lithium titanium oxide. These negative-electrode active materials may be used alone or in combination of two or more.

((E) Carbon Material Having a d Value of the Lattice Plane [002] of 0.340 nm or Less as Determined by X Ray Diffraction)

Examples of (E) the carbon material having a d value of the lattice plane [002] of 0.340 nm or less as determined by X ray diffraction as a negative-electrode active material include, for example, pyrolytic carbons, cokes (for example, pitch coke, needle coke, petroleum coke, and the like), graphites, calcined products of organic polymer compounds (for example, those obtained by calcining and carbonizing a phenol resin, a furan resin, and the like at an appropriate temperature), carbon fiber, and activated carbon. These may be graphitized. The above carbon materials preferably have an interplanar spacing (d002) of the plane [002] of 0.340 nm or less as measured by the X-ray diffraction method. In particular, preferred is a graphite having a true density of 1.70 g/cm$^3$ or more or a high-crystallinity carbon material having characteristics similar to that.

((F) Carbon Material Having a d Value of the Lattice Plane [002] of More than 0.340 nm as Determined by X Ray Diffraction)

Examples of (F) the carbon material having a d value of the lattice plane [002] of more than 0.340 nm as determined by X ray diffraction as a negative-electrode active material include amorphous carbon, which is a carbon material showing almost no change in the layer structure even upon heat treatment at a high temperature of 2000° C. or more. For example, non-graphitizable carbon (hard carbon), mesocarbon microbeads (MCMB) calcined at 1500° C. or less, mesophase pitch carbon fiber (MCF), and the like. A representative example is Carbotron® P available from Kureha Corporation.

((G) Oxide of One or More Metals Selected from Si, Sn, and Al)

Examples of (G) the oxide of one or more metals selected from Si, Sn, and Al as a negative-electrode active material include, for example, silicon oxides, tin oxides, and the like, which are capable of doping/de-doping lithium ions.

Examples include $SiO_x$ having a structure in which ultrafine particles of Si are dispersed in $SiO_2$ and the like. When this material is used as a negative-electrode active material, charge and discharge can be smoothly performed because Si reacted with Li is of ultrafine particles. Further, when a compound (paste) for forming a negative-electrode active-material layer is made of this material, the coatability and the adhesiveness of a negative-electrode mixture layer with a current collector are also good because $SiO_x$ particles themselves having the above structure have small surface areas.

It is noted that a higher capacity and better charge-discharge cycle characteristics can be simultaneously obtained when $SiO_x$ is used along with graphite as (E) the negative-electrode active material in a specific ratio. This is because $SiO_x$ shows a large volume change upon charge and discharge.

((H) One or More Metals Selected from Si, Sn, and Al or an Alloy Comprising the One or More Metals, or an Alloy of Lithium and the One or More Metals or the Alloy)

Examples of (H) the one or more metals selected from Si, Sn, and Al or an alloy comprising the one or more metals, or an alloy of lithium and the one or more metals or the alloy as a negative-electrode active material include, for example, metals such as silicon, tin, and aluminum; silicon alloys; tin alloys; aluminum alloys; and the like. Materials in which these metals and alloys are alloyed with lithium during charge and discharge can also be used.

Preferred specific examples of these include elemental metals (for example, powdered materials) such as, for example, silicon (Si) and tin (Sn); alloys of the above metals; compounds containing the above metals; alloys including tin (Sn) and cobalt (Co) in the above metals; and the like as described in WO2004/100293, Japanese Unexamined Patent Application, Publication No. 2008-016424, and the like. Use of the above metals for electrodes is preferred because a high charge capacity can be obtained, and expansion and contraction of the volume upon charge and discharge are relatively small. Further, these metals are known to be alloyed with Li upon charging, leading to a high charge capacity when they are used for negative electrodes of lithium-ion secondary batteries. Therefore, use of these metals is also preferred in this regard.

Further, a negative-electrode active material formed from silicon pillars having a submicron diameter, a negative-electrode active material including silicon fiber, and the like as described in WO2004/042851, WO2007/083155, and the like can be used.

((I) Lithium Titanium Oxide)

Examples of (I) the lithium titanium oxide as a negative-electrode active material can include, for example, lithium titanates having the spinel structure, lithium titanates having the ramsdellite structure, and the like.

Lithium titanates having the spinel structure can include, for example, $Li_{4+\alpha}Ti_3O_{12}$ ($\alpha$ varies within the range of $0 \leq \alpha \leq 3$ due to charge and discharge reactions). Further, lithium titanates having the ramsdellite structure include, for example, $Li_{2+\beta}Ti_3O_7$ ($\beta$ varies within the range of $0 \leq \beta \leq 3$ due to charge and discharge reactions). These negative-electrode active materials can be prepared in accordance with the methods of manufacture and the like as described in, for example in Japanese Unexamined Patent Application, Publication No. 2007-018883, Japanese Unexamined Patent Application, Publication No. 2009-176752, and the like.

For example, hard carbon; oxides such as $TiO_2$, $V_2O_3$, and $MoO_3$; and the like may be used as a negative-electrode active material in a sodium-ion secondary battery where cations in a nonaqueous electrolytic solution are mostly sodium ions. For example, the followings can be used as a positive-electrode active material in a sodium-ion secondary battery where cations in a nonaqueous electrolytic solution are mostly sodium ions: sodium-containing transition metal composite oxides such as $NaFeO_2$, $NaCrO_2$, $NaNiO_2$, $NaMnO_2$, and $NaCoO_2$; mixtures of multiple transition metals such as Fe, Cr, Ni, Mn, and Co of those sodium-containing transition metal composite oxides; those in which some of the transition metals of these sodium-containing transition metal composite oxides are replaced with different metals other than the transition metals; phosphate compounds of transition metals such as $Na_2FeP_2O_7$ and $NaCo_3(PO_4)_2P_2O_7$; sulfides such as $TiS_2$ and $FeS_2$; or electrically conductive polymers such as polyacethylene, poly(p-phenylene), polyaniline, and polypyrrole; activated carbon; radical-generating polymers; carbon materials; and the like.

[Negative-Electrode Current Collector]

(c) The negative electrode has a negative-electrode current collector. As the negative-electrode current collector, for example, copper, stainless steel, nickel, titanium, or alloys thereof can be used.

[Negative-Electrode Active-Material Layer]

In (c) the negative electrode, for example, a negative-electrode active-material layer is formed on at least one surface of the negative-electrode current collector. The negative-electrode active-material layer includes, for example, the aforementioned negative-electrode active material, a binding agent, and, if desired, an electrically conductive agent.

Examples of the binding agent include polytetrafluoroethylene, poly(vinylidene fluoride), a styrene-butadiene rubber (SBR) resin, or the like.

Examples of the electrically conductive agent include, for example, carbon materials such as acetylene black, Ketjen black, carbon fiber, or graphite (granular graphite and flaky graphite).

[Method of Manufacturing Electrodes ((b) the Positive Electrode and (c) the Negative Electrode)]

An electrode can be obtained, for example, by dispersing and kneading predetermined loading amounts of an active material, a binding agent, and, if desired, an electrically conductive agent into a solvent such as N-methyl-2-pyrrolidone (NMP) and water, and applying the resulting paste on a current collector, and drying to form an active-material layer. The resulting electrode is preferably compressed by a method such as roll press to adjust the electrode to a suitable density.

[(d) Separator]

The nonaqueous electrolytic solution battery according to the present invention includes (d) the separator. As a separator for preventing contact between (b) the positive electrode and (c) the negative electrode, non-woven fabrics and porous sheets made of polyolefins such as polypropylene and polyethylene; cellulose; paper; or glass fiber; and the like. These films are preferably microporous so that penetration by an electrolytic solution can be facilitated for easy permeation of ions.

Polyolefin separators include, for example, lithium-ion permeable membranes capable of electrically insulating the positive electrode from the negative electrode, for example, microporous polymer films such as porous polyolefin films. Specific examples of porous polyolefin films include, for example, porous polyethylene films alone, or multilayer films in which a porous polyethylene film and a porous polypropylene film are layered. Examples also include composite films with a porous polyethylene film and a polypropylene film, and the like.

[Housing]

As a housing for nonaqueous electrolytic solution batteries which can be used when assembling the present nonaqueous electrolytic solution battery, for example, metal cans of a coin-type, a cylinder-type, a rectangle-type, and the like; and laminate housings can be used. Materials for metal cans include, for example, nickel-plated steel sheets, stainless steel sheets, nickel-plated stainless steel sheets, aluminum or an alloy thereof, nickel, titanium, and the like. As laminate housings, for example, laminate films such as an aluminum laminate film, a stainless steel laminate film, laminate films of silica-coated polypropylene and polyethylene can be used.

There is no particular limitation for the configuration of the nonaqueous electrolytic solution battery according to the present embodiment, but the configuration may be such that an electrode element having a positive electrode and a negative electrode arranged in a countering manner, and a nonaqueous electrolytic solution are included inside a housing. There is no particular limitation for the shape of the nonaqueous electrolytic solution battery, but a coin-like, cylindrical, rectangular, or aluminum laminate sheet-like electrochemical device may be assembled with the components described above.

EXAMPLES

Below, the methods of synthesizing difluoro ionic complexes (cis/trans isomers) and tetrafluoro ionic complexes will be described. The methods disclosed in Patent Document 8, Nonpatent Document 1, and Patent Document 9 were used herein to synthesize ionic complexes. However, methods other than these may be used to synthesize them. In any cases, raw materials and products were handled under a nitrogen atmosphere of a dew point of $-50°$ C. or less. Further, a glass reactor used was dried at $150°$ C. for 12 hours or more, and then cooled to room temperature under a nitrogen stream of a dew point of $-50°$ C. or less before use.

[Synthesis Example 1] Synthesis of (1a-Trans) and (1a-Cis)

Lithium tris(oxalato)phosphate as a three-coordinate complex of oxalic acid was obtained according to the method disclosed in Patent Document 9. Lithium tris(oxalato)phosphate (30 g, 99.4 mmol) was dissolved in dimethyl carbonate (hereinafter, referred to as DMC) (120 mL), and hydrogen fluoride (hereinafter, referred to as HF) (11.9 g, 596.4 mmol) was then added. After stirring at $25°$ C. for 72 hours, residual HF and DMC were removed under reduced pressure. Then, DMC (60 mL) was added, and the concentrated residue was dissolved as much as possible, and then concentrated until the concentration of an Li salt became about 45 mass %. After removing insoluble components including oxalic acid by filtration, 49 g of a DMC solution of a mixture of (1a-Trans) and (1a-Cis) was obtained. Dichloromethane (hereinafter, referred to as "$CH_2Cl_2$") was added to the DMC solution of the mixture at $25°$ C., and stirred for 12 hours to obtain a precipitated solid. The solid was separated from the mother liquor by filtration, and the mother liquor was distilled to remove DMC under reduced pressure until a solid was obtained. The filtered solid and the solid obtained from the mother liquor were separately dissolved in $CH_2Cl_2$ to separately prepare DMC solutions with a concentration of about 45 mass %, and $CH_2Cl_2$ was then added to allow a solid to precipitate. The solids were recovered separately by filtration, and the preparation of a DMC solution with a concentration of about 45 mass % and the precipitation of a solid were further repeated for several times by a similar procedure to obtain (1a-Trans) and (1a-Cis) with F and P purities of 99.9 mol % (as determined by NMR).

(1a-Trans) and (1a-Cis) were dissolved separately in acetonitrile, and subjected to LC/MS (the ESI method, polarity: negative, fragment voltage: 50 V) to measure molecular weight. A parent ion was observed at m/z 244.9 for both, which is consistent with a theoretical mass number of 244.93 (the anion moiety). Further, the steric conformation was determined by the single crystal X-ray structure analysis. FIG. 1 shows the ORTEP diagram of (1a-Cis). (1a-Cis) is in the cis configuration in which two fluorine atoms are bonded in the same side when viewed from the central element.

(1a-Cis) and (1a-Trans) clearly have the same atomic composition but different structures because they have the same mass, and F-NMR and P-NMR show their peaks at different positions. Further, (1a-Trans) was determined to be in the trans configuration in which two fluorine atoms are bonded in the opposite sides when viewed from the central element as determined by the single crystal X-ray structure analysis.

[Synthesis Example 2] Synthesis of (5a)

Reactions were performed according to the method described in Patent Document 8. To a 500 mL glass flask, added were 20.0 g (132 mmol) of $LiPF_6$, 110 mL of dimethyl carbonate (DMC), and 11.9 g (132 mmol) of oxalic acid. At this point, $LiPF_6$ was completely dissolved, but the majority of oxalic acid remained unresolved. With stirring at 25° C., 13.4 g (79 mmol) of $SiCl_4$ was added dropwise to the flask, and stirring was then continued for 4 hours. Subsequently, tetrafluorosilane and hydrochloric acid were removed under reduced pressure to obtain a crude DMC solution containing the ionic complex (5a) as the main component (a purity of 91 mol %). This solution was concentrated until the concentration of an Li salt became about 50 mass % to obtain 51 g of a concentrated liquid. After removing insoluble components by filtration, $CH_2Cl_2$ was added with stirring at room temperature. After stirring for 12 hours, a precipitated solid was recovered by filtration. Again, it was dissolved in DMC to prepare a DMC solution with an concentration of an Li-salt of about 50 mass %, and then the addition of $CH_2Cl_2$, precipitation of a solid, and recovery of a solid were performed by a similar procedure to obtain (5a) with F and P purities of 99.9 mol %.

[Synthesis Example 3] Synthesis of (6a-Trans) and (6a-Cis) as Na Adducts of (1a)

A Dow Chemical strongly acidic cation exchange resin 252 (hereinafter, referred to as the ion exchange resin) was weighed out to give 500 g, and immersed in 0.1 N aqueous sodium hydroxide (2.5 kg), and stirred at 25° C. for 6 hours. The ion exchange resin was collected by filtration, and washed thoroughly with pure water until the pH of a wash liquid became 8 or less. Then, water was removed by drying under reduced pressure for 12 hours (120° C., 1.3 kPa). The (1a-Trans)/EMC solution with a concentration of 10 mass % was prepared, to which the dried ion exchange resin in a weight corresponding to half of the weight of the liquid was added, and stirred at 25° C. for 6 hours. Then, the ion exchange resin was removed by filtration to obtain a (6a-Trans)/EMC solution (with a concentration of about 10 mass %) in which cations of $Li^+$ had been exchanged with $Na^+$. The ratio of $Na^+/Li^+$ was 99.5 when cations were quantified by ion chromatography. Further, the (6a-Cis)/EMC solution with a concentration of about 10 mass % was obtained as in the method described above except that the (1a-Cis)/EMC solution with the same concentration was substituted for the (1a-Trans)/EMC solution.

[Synthesis Example 4] Synthesis of (6b-Trans) and (6b-Cis) as K adducts of (1a)

(6b-Trans)/EMC and (6 b-Cis)/EMC solutions with a concentration of about 10 mass % in which cations of $Li^+$ had been exchanged with $K^+$ were obtained by substituting 0.1 N aqueous potassium hydroxide (2.5 kg) for 0.1 N aqueous sodium hydroxide (2.5 kg) used in Synthesis Example 3. The ratio of $K^+/Li^+$ was 99.6 for both solutions when cations were quantified by ion chromatography.

[Synthesis Example 5] Synthesis of (6c-Trans) and (6c-Cis) as TMPA Adducts of (1a)

To 90 g of EMC, 5.7 g (41.7 mmol) of trimethylpropylammonium chloride and 10.0 g (39.7 mmol) of (1a-Trans) were added, and stirred at 45° C. for 6 hours. After cooled to 5° C., insoluble materials were removed by filtration to obtain a (6c-Trans)/EMC solution (with a concentration of about 13 mass %) in which cations of $Li^+$ had been exchanged with trimethylpropylammonium cations (hereinafter, referred to as TMPA). Further, the (6c-Cis)/EMC solution with a concentration of about 13 mass % was obtained as in the method described above except that (1a-Cis) in the same weight was substituted for (1a-Trans). The ratio of $TMPA/Li^+$ was 98.5 for both solutions when cations were quantified by ion chromatography.

[Synthesis Example 6] Synthesis of (6d-Trans) and (6d-Cis) as PP13 Adducts of (1a)

To 90 g of EMC, 7.4 g (41.7 mmol) of 1-butyl-1-methylpyrrolidinium chloride and 10.0 g (39.7 mmol) of (1a-Trans) were added, and stirred at 45° C. for 6 hours. After cooled to 5° C., insoluble materials were removed by filtration to obtain a (6d-Trans)/EMC solution (with a concentration of about 15 mass %) in which cations of $Li^+$ had been exchanged with 1-butyl-1-methylpyrrolidinium cations (hereinafter, referred to as PP13). Further, the (6d-Cis)/EMC solution with a concentration of about 15 mass % was obtained as in the method described above except that (1a-Cis) in the same weight was substituted for (1a-Trans). The ratio of $PP13/Li^+$ was 98.3 for both solutions when cations were quantified by ion chromatography.

[Synthesis Example 7] Synthesis of (5b) as an Na Adduct of (5a)

A (5b)/EMC solution with a concentration of about 10 mass % in which cations of $Li^+$ had been exchanged with $Na^+$ was obtained by substituting a (5a)/EMC solution for the (1a-Trans)/EMC solution used in Synthesis Example 3. The ratio of $Na^+/Li^+$ was 99.4 when cations were quantified by ion chromatography.

[Synthesis Example 8] Synthesis of (5c) as a K Adduct of (5a)

The (5c)/EMC solution with a concentration of about 10 mass % in which cations of $Li^+$ had been exchanged with $K^+$ was obtained by substituting 0.1 N aqueous potassium hydroxide (2.5 kg) for 0.1 N aqueous sodium hydroxide (2.5 kg) used in Synthesis Example 3. The ratio of $K^+/Li^+$ was 99.2 when cations were quantified by ion chromatography.

[Synthesis Example 9] Synthesis of (5d) as a TMPA Adduct of (5a)

The (5d)/EMC solution (with a concentration of about 11 mass %) in which cations of $Li^+$ had been exchanged with trimethylpropylammonium cations (hereinafter, referred to as TMPA) was obtained by substituting 7.9 g (39.7 mmol) of (5a) for 10.0 g (39.7 mmol) of (1a-Trans) used in Synthesis Example 5. The ratio of TMPA/Li$^+$ was 98.6 when cations were quantified by ion chromatography.

[Synthesis Example 10] Synthesis of (5e) as a PP13 Adduct of (5a)

The (5e)/EMC solution (with a concentration of about 13 mass %) in which cations of Li$^+$ had been exchanged with 1-butyl-1-methylpyrrolidinium cations (hereinafter, referred to PP13) was obtained by substituting 7.9 g (39.7 mmol) of (5a) for 10.0 g (39.7 mmol) of (1a-Trans) used in Synthesis Example 6. The ratio of PP13/Li$^+$ was 98.2 for both solutions when cations were quantified by ion chromatography.

[Synthesis Example 11] Synthesis of (1b-Trans) and (1b-Cis)

(1b-Trans) and (1b-Cis) were each obtained as in Synthesis Example 1 except that hexafluoro-2-hydroxyisobutyric acid was used as a raw material instead of oxalic acid.

[Synthesis Example 12] Synthesis of (1c-Trans) and (1c-Cis)

(1c-Trans) and (1c-Cis) were each obtained by applying the method described in Non-Patent Document 1.

TABLE 1

| Electrolytic solution number | Solute 1 mol/L Type | Ionic complex (Main) Type | Loading amount [Mass % relative to electrolytic solution] | (Auxiliary) Type | Loading amount [Mass % relative to electrolytic solution] | Non-aqueous organic solvent Type Volume ratio | |
|---|---|---|---|---|---|---|---|
| 1 | LiPF$_6$ | 1a-Cis Synthesis Example 1 | 0.05 | 1a-Trans Synthesis Example 1 | 0 | — | — EMC:EC = 2:1 |
| 2 | Same as above | Same as above | 0.1 | Same as above | 0 | — | — Same as above |
| 3 | Same as above | Same as above | 0.8 | Same as above | 0 | — | — Same as above |
| 4 | Same as above | Same as above | 1.0 | Same as above | 0 | — | — Same as above |
| 5 | Same as above | Same as above | 3.0 | Same as above | 0 | — | — Same as above |
| 6 | Same as above | Same as above | 5.0 | Same as above | 0 | — | — Same as above |
| 7 | Same as above | Same as above | 0 | Same as above | 0 | — | — Same as above |
| 8 | Same as above | Same as above | 0 | Same as above | 0.1 | — | — Same as above |
| 9 | Same as above | Same as above | 0 | Same as above | 1.0 | — | — Same as above |
| 10 | Same as above | Same as above | 0 | Same as above | 3.0 | — | — Same as above |
| 11 | Same as above | 6a-Cis Synthesis Example 3 | 1.0 | 6a-Trans Synthesis Example 3 | 0 | — | — Same as above |
| 12 | Same as above | Same as above | 0 | Same as above | 1.0 | — | — Same as above |
| 13 | Same as above | 6b-Cis Synthesis Example 4 | 1.0 | 6b-Trans Synthesis Example 4 | 0 | — | — Same as above |
| 14 | Same as above | Same as above | 0 | Same as above | 1.0 | — | — Same as above |
| 15 | Same as above | 6c-Cis Synthesis Example 5 | 1.0 | 6c-Trans Synthesis Example 5 | 0 | — | — Same as above |
| 16 | Same as above | Same as above | 0 | Same as above | 1.0 | — | — Same as above |
| 17 | Same as above | 6d-Cis Synthesis Example 6 | 1.0 | 6d-Trans Synthesis Example 6 | 0 | — | — Same as above |
| 18 | Same as above | Same as above | 0 | Same as above | 1.0 | — | — Same as above |
| 19 | Same as above | 1c-Cis Synthesis Example 12 | 0.8 | 1c-Trans Synthesis Example 12 | 0 | — | — Same as above |
| 20 | Same as above | Same as above | 0 | Same as above | 0.8 | — | — Same as above |
| 21 | Same as above | 1b-Cis Synthesis Example 11 | 1.0 | 1b-Trans Synthesis Example 11 | 0 | — | — Same as above |
| 22 | Same as above | Same as above | 0 | Same as above | 1.0 | — | — Same as above |

TABLE 2

| Electrolytic solution number | Solute 1 mol/L Type | Ionic complex (Main) Type | Loading amount [Mass % relative to electrolytic solution] | (Auxiliary) Type | Loading amount [Mass % relative to electrolytic solution] | — | — | Non-aqueous organic solvent Type Volume ratio |
|---|---|---|---|---|---|---|---|---|
| 23 | LiBF$_4$ | 1a-Cis Synthesis Example 1 | 1.0 | 1a-Trans Synthesis Example 1 | 0 | — | — | EMC:EC = 2:1 |
| 24 | Same as above | Same as above | 0 | Same as above | 0 | | | Same as above |
| 25 | Same as above | Same as above | 0 | Same as above | 1.0 | | | Same as above |
| 26 | LiFSI | Same as above | 1.0 | Same as above | 0 | | | Same as above |
| 27 | Same as above | Same as above | 0 | Same as above | 0 | | | Same as above |
| 28 | Same as above | Same as above | 0 | Same as above | 1.0 | | | Same as above |
| 29 | LiDFPI | Same as above | 1.0 | Same as above | 0 | | | Same as above |
| 30 | Same as above | Same as above | 0 | Same as above | 0 | | | Same as above |
| 31 | Same as above | Same as above | 0 | Same as above | 1.0 | | | Same as above |
| 32 | NaPF$_6$ | 6a-Cis Synthesis Example 3 | 1.0 | 6a-Trans Synthesis Example 3 | 0 | | | EMC:PC = 2:1 |
| 33 | Same as above | Same as above | 0 | Same as above | 0 | | | Same as above |
| 34 | Same as above | Same as above | 0 | Same as above | 1.0 | | | Same as above |

TABLE 3

| Electrolytic solution number | Solute 1 mol/L Type | Ionic complex (Main) Type | Loading amount [Mass % relative to electrolytic solution] | (Auxiliary) Type | Loading amount [Ratio to (Main)] | — | — | Non-aqueous organic solvent Type Volume ratio |
|---|---|---|---|---|---|---|---|---|
| 35 | LiPF$_6$ | 1a-Cis Synthesis Example 1 | 1.0 | 1a-Trans Synthesis Example 1 | 0.002 | — | — | EMC:EC = 2:1 |
| 36 | Same as above | Same as above | 1.0 | Same as above | 0.005 | — | — | Same as above |
| 37 | Same as above | Same as above | 1.0 | Same as above | 0.01 | — | — | Same as above |
| 38 | Same as above | 6a-Cis Synthesis Example 3 | 1.0 | 6a-Trans Synthesis Example 3 | 0.01 | — | — | Same as above |
| 39 | Same as above | 6b-Cis Synthesis Example 4 | 1.0 | 6b-Trans Synthesis Example 4 | 0.01 | — | — | Same as above |
| 40 | Same as above | 6c-Cis Synthesis Example 5 | 1.0 | 6c-Trans Synthesis Example 5 | 0.01 | — | — | Same as above |
| 41 | Same as above | 6d-Cis Synthesis Example 6 | 1.0 | 6d-Trans Synthesis Example 6 | 0.01 | — | — | Same as above |
| 42 | Same as above | 1c-Cis Synthesis Example 12 | 0.8 | 1c-Trans Synthesis Example 12 | 0.01 | — | — | Same as above |
| 43 | Same as above | 1b-Cis Synthesis Example 11 | 1.0 | 1b-Trans Synthesis Example 11 | 0.01 | — | — | Same as above |

TABLE 4

| Electrolytic solution number | Solute 1 mol/L Type | Ionic complex (Main) Type | Loading amount [Mass % relative to electrolytic solution] | (Auxiliary) Type | Loading amount [Ratio to (Main)] | — | — | Non-aqueous organic solvent Type Volume ratio |
|---|---|---|---|---|---|---|---|---|
| 44 | LiBF$_4$ | 1a-Cis Synthesis Example 1 | 1.0 | 1a-Trans Synthesis Example 1 | 0.01 | — | — | EMC:EC = 2:1 |

TABLE 4-continued

| Electrolytic solution number | Solute 1 mol/L Type | Ionic complex (Main) Type | Loading amount [Mass % relative to electrolytic solution] | Type | Loading amount [Ratio to (Main)] | Non-aqueous organic solvent Type Volume ratio | |
|---|---|---|---|---|---|---|---|
| 45 | LiFSI | Same as above | 1.0 | Same as above | 0.01 | — | — Same as above |
| 46 | LiDFPI | Same as above | 1.0 | Same as above | 0.01 | — | — Same as above |
| 47 | NaPF$_6$ | Same as above | 1.0 | Same as above | 0.01 | — | — EMC:PC = 2:1 |

TABLE 5

| Electrolytic solution number | Solute 1 mol/L Type | Ionic complex (Main) Type | Loading amount [Mass % relative to electrolytic solution] | Type | Loading amount [Ratio to (Main)] | Type | Loading amount [Ratio to (Main)] | Non-aqueous organic solvent Type Volume ratio |
|---|---|---|---|---|---|---|---|---|
| 48 | LiPF$_4$ | 1a-Cis Synthesis Example 1 | 1.0 | 1a-Trans Synthesis Example 1 | 0 | 5a Synthesis Example 2 | 0.07 | EMC:EC = 2:1 |
| 49 | Same as above | Same as above | 1.0 | Same as above | 0 | Same as above | 0.12 | Same as above |
| 50 | Same as above | Same as above | 1.0 | Same as above | 0 | Same as above | 0.20 | Same as above |

TABLE 6

| Electrolytic solution number | Solute 1 mol/L Type | Ionic complex (Main) Type | Loading amount [Mass % relative to electrolytic solution] | Type | Loading amount [Ratio to (Main)] | Type | Loading amount [Ratio to (Main)] | Non-aqueous organic solvent Type Volume ratio |
|---|---|---|---|---|---|---|---|---|
| 51 | LiPF$_4$ | 1a-Cis Synthesis Example 1 | 0.1 | 1a-Trans Synthesis Example 1 | 0.002 | 5a Synthesis Example 2 | 0.07 | EMC:EC = 2:1 |
| 52 | Same as above | Same as above | 0.1 | Same as above | 0.005 | Same as above | 0.12 | Same as above |
| 53 | Same as above | Same as above | 1.0 | Same as above | 0.002 | Same as above | 0.07 | Same as above |
| 54 | Same as above | Same as above | 1.0 | Same as above | 0.005 | Same as above | 0.12 | Same as above |
| 55 | Same as above | Same as above | 1.0 | Same as above | 0.01 | Same as above | 0.2 | Same as above |
| 56 | Same as above | Same as above | 3.0 | Same as above | 0.005 | Same as above | 0.12 | Same as above |
| 57 | Same as above | Same as above | 3.0 | Same as above | 0.01 | Same as above | 0.2 | Same as above |
| 58 | Same as above | 6a-Cis Synthesis Example 3 | 1.0 | 6a-Trans Synthesis Example 3 | 0.01 | 5b Synthesis Example 7 | 0.2 | Same as above |
| 59 | Same as above | 6b-Cis Synthesis Example 4 | 1.0 | 6b-Trans Synthesis Example 4 | 0.01 | 5c Synthesis Example 8 | 0.2 | Same as above |
| 60 | Same as above | 6c-Cis Synthesis Example 5 | 1.0 | 6c-Trans Synthesis Example 5 | 0.01 | 5d Synthesis Example 9 | 0.2 | Same as above |
| 61 | Same as above | 6d-Cis Synthesis Example 6 | 1.0 | 6d-Trans Synthesis Example 6 | 0.01 | 5e Synthesis Example 10 | 0.2 | Same as above |

TABLE 7

| Electrolytic solution number | Solute Type Concentration | Ionic complex (Main) Type | Loading amount [Mass % relative to electrolytic solution] | Type | Loading amount [Ratio to (Main)] | Type | Loading amount [Ratio to (Main)] | Non-aqueous organic solvent Type Volume ratio |
|---|---|---|---|---|---|---|---|---|
| 62 | LiPF$_6$ 1.1 mol/L | 1a-Cis Synthesis Example 1 | 1.1 | 1a-Trans Synthesis Example 1 | 0.005 | 5a Synthesis Example 2 | 0.12 | PC:EMC:DEC = 30:40:30 |
| 63 | Same as above | — | — | — | — | — | — | Same as above |
| 64 | LiPF$_6$ 1.2 mol/L | 1a-Cis Synthesis Example 1 | 1.2 | 1a-Trans Synthesis Example 1 | 0.005 | 5a Synthesis Example 2 | 0.12 | EC:EMC:DEC = 25:45:30 |
| 65 | Same as above | — | — | — | — | — | — | Same as above |
| 66 | Same as above | 1a-Cis Synthesis Example 1 | 1.2 | 1a-Trans Synthesis Example 1 | 0.005 | 5a Synthesis Example 2 | 0.12 | EC:EMC:FEC = 20:70:10 |
| 67 | Same as above | — | — | — | — | — | — | Same as above |
| 68 | LiPF$_6$ 1.1 mol/L LiBF$_4$ 0.4 mol/L | 1a-Cis Synthesis Example 1 | 1.2 | 1a-Trans Synthesis Example 1 | 0.005 | 5a Synthesis Example 2 | 0.12 | PC:EMC = 30:70 |
| 69 | Same as above | — | — | — | — | — | — | Same as above |
| 70 | LiPF$_6$ 1.2 mol/L | 1a-Cis Synthesis Example 1 | 1.2 | 1a-Trans Synthesis Example 1 | 0.005 | 5a Synthesis Example 2 | 0.12 | EC:EMC:FEC = 30:63:7 |
| 71 | Same as above | — | — | — | — | — | — | Same as above |

In Tables 1 to 7, EMC stands for ethylmethyl carbonate; EC stands for ethylene carbonate; PC stands for propylene carbonate; DEC stands for diethyl carbonate; and FEC stands for fluoroethylene carbonate. LiBF$_4$ stands for lithium tetrafluoroborate; LiFSI stands for bis(fluorosulfonyl)imide-lithium; LiDFPI stands for bis(difluorophosphonyl)imide-lithium; and NaPF$_6$ stands for sodium hexafluorophosphate. Solutes shown in Tables 1 to 7 and ionic complexes shown in Tables 1 to 7 were added to nonaqueous organic solvents shown in Tables 1 to 7 in the ratios shown in Tables 1 to 7 in the order of the solutes and then ionic complexes, and stirred for 1 hour to obtain electrolytic solutions for non-aqueous electrolytic solution batteries 1 to 71 (which correspond to the electrolytic solution numbers in the tables). It is noted that the electrolytic solutions for nonaqueous electrolytic solution batteries shown in Tables 1 to 7 were prepared while maintaining the temperature of solutions at 40° C. or less.

Production of Nickel-Manganese-Cobalt (NMC) Ternary Positive Electrode

To 90 mass % of a LiNi$_{1/3}$Mn$_{1/3}$O$_{1/3}$O$_2$ powder, 5 mass % of poly(vinylidene fluoride) (hereinafter, referred to as PVDF) (binder) and 5 mass % of acetylene black (electrically conductive material) were added, and N-methylpyrrolidone (hereinafter, referred to as NMP) was further added to produce a positive-electrode mixture paste. The resulting paste was applied to an aluminum foil (current collector), dried, and pressurized. Then the aluminum foil was punched out into a predetermined size to obtain a test NMC positive electrode.

Production of Graphite Negative Electrode

PVDF as a binder in an amount of 10 mass % was mixed with 90 mass % of a graphite powder, and NMP was further added to produce a negative-electrode mixture paste. The above paste was applied to a copper foil (current collector), dried, and pressurized. Then the copper foil was punched out into a predetermined size to obtain a test graphite negative electrode.

Production of Nonaqueous Electrolytic Solution Batteries (1)

Aluminum laminate housing cells (with a capacity of 30 mAh) including the above test NMC positive electrode, the above test graphite negative electrode, and a cellulose separator impregnated with one of electrolytic solutions (1 to 31) shown in Tables 1 and 2 were assembled to obtain nonaqueous electrolytic solution batteries according to Examples 1-1 to 1-12, 2-1 to 2-3, and Comparative Examples 1-1 to 1-10, 2-1 to 2-6.

Evaluation: Discharge Capacity after Cycles (0° C.)

For each of the nonaqueous electrolytic solution batteries according to Examples 1-1 to 1-12, 2-1 to 2-3 and Comparative Examples 1-1 to 1-10, 2-1 to 2-6, charge and discharge tests (500 times, a 3 C rate, 3 to 4.3 V) were performed at an environmental temperature of 60° C. Subsequently, the cells were cooled to 25° C., and discharged to 3.0 V, and then again charged to 4.3 V at a 0.2 C rate at 0° C., and maintained at 4.3 V for 1 hour. The cells were then discharged to 3.0 V at a 5 C rate while keeping the temperature at 0° C., and the capacity obtained at that time was taken as the discharge capacity after cycle (0° C.)

The evaluation results from Examples 1-1 to 1-12 and Comparative Examples 1-2 to 1-10 are shown in Table 7 as relative values when the evaluation results from Comparative Example 1-1 are taken as 100. The evaluation results from Example 2-1 and Comparative Example 2-1, Example 2-2 and Comparative Example 2-3, and Example 2-3 and Comparative Example 2-5 are shown in Table 8 as relative values when the evaluation results from Comparative Examples 2-2, 2-4, and 2-6 are taken as 100, respectively.

NaFe$_{0.5}$Co$_{0.5}$O$_2$ Positive Electrode

A powder of $NaFe_{0.5}Co_{0.5}O_2$ in an amount of 85 mass % was mixed with 5 mass % of PVDF (binder) and 10 mass % of acetylene black (electrically conductive material), and NMP was further added to produce a positive-electrode mixture paste. The above paste was applied to an aluminum foil (current collector), dried, and pressurized. Then the aluminum foil was punched out into a predetermined size to obtain a test $NaFe_{0.5}Co_{0.5}O_2$ positive electrode.

Hard-Carbon Negative Electrode

A powder of hard carbon in an amount of 90 mass % was mixed with 10 mass % of PVDF, and NMP was further added to produce a negative-electrode mixture paste. The above paste was applied to a copper foil (current collector), dried, and pressurized. Then the copper foil was punched out into a predetermined size to obtain a test hard-carbon negative electrode.

Production of Nonaqueous Electrolytic Solution Batteries (2)

Aluminum laminate housing cells (with a capacity of 30 mAh) including the above test $NaFe_{0.5}Co_{0.5}O_2$ positive electrode, the above test hard-carbon negative electrode, and a cellulose separator impregnated with one of the electrolytic solutions (32 to 34) shown in Table 2 were assembled to obtain the nonaqueous electrolytic solution batteries according to Example 2-4, Comparative Examples 2-7 and 2-8.

Evaluation: Discharge Capacity after Cycles (0° C.)

For each of the nonaqueous electrolytic solution batteries according to Example 2-4, Comparative Examples 2-7 and 2-8, charge and discharge tests (500 times, a 3 C rate, 1.5 to 3.8 V) were performed at an environmental temperature of 60° C. Subsequently, the cells were cooled to 25° C., and discharged to 1.5 V, and then again charged to 3.8 V at a 0.2 C rate at 0° C., and maintained at 3.8 V for 1 hour. The cells were then discharged to 1.5 V at a 5 C rate while keeping the temperature at 0° C., and the capacity obtained at that time was taken as the discharge capacity after cycle (0° C.). The evaluation results from Example 2-4 and Comparative Example 2-7 are shown in Table 8 as relative values when the evaluation results from Comparative Example 2-8 are taken as 100.

TABLE 8

| | Positive electrode | Negative electrode | Electrolytic solution number | Discharge capacity after cycles, 0° C. Relative value |
|---|---|---|---|---|
| Example 1-1 | NMC | Graphite | 1 | 105 |
| Example 1-2 | Same as above | Same as above | 2 | 110 |
| Example 1-3 | Same as above | Same as above | 3 | 120 |
| Example 1-4 | Same as above | Same as above | 4 | 125 |
| Example 1-5 | Same as above | Same as above | 5 | 120 |
| Example 1-6 | Same as above | Same as above | 6 | 105 |
| Comparative Example 1-1 | Same as above | Same as above | 7 | 100 |
| Comparative Example 1-2 | Same as above | Same as above | 8 | 105 |
| Comparative Example 1-3 | Same as above | Same as above | 9 | 120 |
| Comparative Example 1-4 | Same as above | Same as above | 10 | 115 |
| Example 1-7 | Same as above | Same as above | 11 | 125 |
| Comparative Example 1-5 | Same as above | Same as above | 12 | 120 |
| Example 1-8 | Same as above | Same as above | 13 | 125 |
| Comparative Example 1-6 | Same as above | Same as above | 14 | 120 |
| Example 1-9 | Same as above | Same as above | 15 | 115 |
| Comparative Example 1-7 | Same as above | Same as above | 16 | 110 |
| Example 1-10 | Same as above | Same as above | 17 | 115 |
| Comparative Example 1-8 | Same as above | Same as above | 18 | 110 |
| Example 1-11 | Same as above | Same as above | 19 | 120 |
| Comparative Example 1-9 | Same as above | Same as above | 20 | 115 |
| Example 1-12 | Same as above | Same as above | 21 | 115 |
| Comparative Example 1-10 | Same as above | Same as above | 22 | 110 |

The nonaqueous electrolytic solution batteries containing the difluoro ionic complex (1a-Cis) according to Example showed a high discharge capacity after cycles (0° C.) as compared with the nonaqueous electrolytic solution battery which does not contain the ionic complex (Comparative Example 1-1). In particular, comparison of Example 1-2, Example 1-3, and Example 1-4 with Comparative Example 1-2, Comparative Example 1-3, and Comparative Example 1-4, respectively, revealed that the difluoro ionic complex (1a-Cis) in the cis configuration had a higher effect than the difluoro ionic complex (1a-Trans) in the trans configuration. Further, as shown in Example 1-1, the effect of the difluoro ionic complex (1a-Cis) was slightly observed even when the content was 0.05 mass %. As shown in Examples 1-1 to 1-4, the effect was found to increase as the content of the ionic complex increased from 0.05 mass % to 0.1, 0.8, and 1.0 mass %. As shown in Example 1-5, when the content of the difluoro ionic complex (1a-Cis) was 3 mass %, the effect was slightly decreased as compared with the case of 1 mass %. As shown in Example 1-6, when the content was 5 mass %, the effect was significantly decreased as compared with the case of 1 mass %. This may be explained as follows. The viscosity of the electrolytic solution is increased when the content of the difluoro ionic complex (1a-Cis) is 3 mass % or more. This may restrict movement of cations within the nonaqueous electrolytic solution batteries, resulting in decreased battery performance.

Further, when the ionic complexes (1a-Cis), (6a-Cis), and (6b-Cis) containing $Li^+$, $Na^+$, and $K^+$ as cations, respectively, were compared as shown in Examples 1-4, 1-7, and 1-8, their effects showed no difference, and all showed a high discharge capacity after cycles (0° C.). The cis isomers tended to show a higher effect than the trans isomers. The tendency was also similar. Similarly, the ionic complexes (1a-Cis), (6c-Cis), and (6d-Cis) containing $Li^+$, TMPA, and PP13 as cations, respectively, were compared as shown in Example 1-4, Example 1-9, and Example 1-10, and $Li^+$ showed the best result although TMPA and PP13 also showed certain effects. This may be because the content of anions as the effective moieties was decreased due to the large molecular weights of the cations of TMPA and PP13, and because parts of TMPA and PP13 were reductively or oxidatively decomposed, and decomposition residues were deposited as highly resistive materials on the surface of an electrode.

As shown in Example 1-11, (1c-Cis) in which the central element M was changed from P to Si had a low solubility, and was not sufficiently dissolved at 1.0 mass %, but showed a relatively good effect when added at 0.8 mass %. Further, when (1b-Cis) having a different ligand was added, a higher discharge capacity after cycles (0° C.) was obtained as compared with the case of (1b-Cis)-free as shown in Example 1-1.

Examples 2-1 to 2-4 and Comparative Examples 2-1 to 2-8

TABLE 9

|  | Positive electrode | Negative electrode | Electrolytic solution number | Discharge capacity after cycles, 0° C. Relative value |
|---|---|---|---|---|
| Example 2-1 | NMC | Graphite | 23 | 115 |
| Comparative Example 2-1 | Same as above | Same as above | 25 | 110 |
| Comparative Example 2-2 | Same as above | Same as above | 24 | 100 |
| Example 2-2 | Same as above | Same as above | 26 | 120 |
| Comparative Example 2-3 | Same as above | Same as above | 28 | 115 |
| Comparative Example 2-4 | Same as above | Same as above | 27 | 100 |
| Example 2-3 | Same as above | Same as above | 29 | 120 |
| Comparative Example 2-5 | Same as above | Same as above | 31 | 115 |
| Comparative Example 2-6 | Same as above | Same as above | 30 | 100 |
| Example 2-4 | NaFe$_{0.5}$Co$_{0.5}$O$_2$ | Hard carbon | 32 | 140 |
| Comparative Example 2-7 | Same as above | Same as above | 34 | 130 |
| Comparative Example 2-8 | Same as above | Same as above | 33 | 100 |

Nonaqueous electrolytic solution batteries as shown in Examples 2-1 to 2-4 which contained any one of the difluoro ionic complexes (1a-Cis) or (6a-Cis) and also contained LiBF$_4$, LiFSI, LiDFPI, or NaPF$_6$ as a solute showed a higher discharge capacity after cycles (0° C.) than the nonaqueous electrolytic solution batteries as shown in Comparative Examples 2-1 to 2-8 which did not contain the ionic complexes. In particular, comparison of Examples 2-1 to 2-4 with Comparative Examples 2-1, 2-3, 2-5, and 2-7, respectively, revealed that the difluoro ionic complexes (1a-Cis) and (6a-Cis) in the cis configuration were found to show a higher effect than the difluoro ionic complexes (1a-Trans) and (6a-Trans) in the trans configuration. Production of nonaqueous electrolytic solution batteries (3)

Aluminum laminate housing cells (with a capacity of 30 mAh) including the above test NMC positive electrode, the above test graphite negative electrode, and a cellulose separator impregnated with one of the electrolytic solutions (35 to 43, 4, 7, 11, 13, 15, 17, 19, and 21) shown in Tables 1 and 3 were assembled to obtain the nonaqueous electrolytic solution batteries according to Examples 3-1 to 3-16, 4-1 to 4-3, and 4-5 to 4-7, and Comparative Examples 3-1, 4-1 to 4-3.

Evaluation: Discharge Capacity after Cycles (0° C.)+Discharge Capacity after Storage (0° C.)

For each of the nonaqueous electrolytic solution batteries according to Examples 3-1 to 3-16, 4-1 to 4-3, and 4-5 to 4-7, and Comparative Examples 3-1, 4-1 to 4-3, the discharge capacity after cycles (0° C.) was evaluated as in Example 1-1.

For each of the nonaqueous electrolytic solution batteries according to Examples 3-1 to 3-16, 4-1 to 4-3, and 4-5 to 4-7, and Comparative Examples 3-1, 4-1 to 4-3, storage tests (stored for 10 days after charged to 4.3 V) were performed at an environmental temperature of 60° C. Subsequently, the cells were cooled to 25° C., and discharged to 3.0 V, and then again charged to 4.3 V at a 0.2 C rate at 0° C., and maintained at 4.3 V for 1 hour. The cells were then discharged to 3.0 V at a 5 C rate while keeping the temperature at 0° C., and the capacity obtained at that time was taken as the discharge capacity after storage (0° C.)

The evaluation results from Examples 3-1 to 3-16 are shown in Table 9 as relative values when the evaluation results of Comparative Example 3-1 are taken as 100. The evaluation results from Examples 4-1 and 4-5, 4-2 and 4-6, and 4-3 and 4-7 are shown in Table 10 as relative values when the evaluation results from Comparative Examples 4-1, 4-2, and 4-3 are taken as 100, respectively.

Production of Nonaqueous Electrolytic Solution Batteries (4)

Aluminum laminate housing cells (with a capacity of 30 mAh) including the above test NaFe$_{0.5}$Co$_{0.5}$O$_2$ positive electrode, the above test hard-carbon negative electrode, and a cellulose separator impregnated with one of the electrolytic solutions (32, 33, and 47) shown in Tables 2 and 4 were assembled to obtain the nonaqueous electrolytic solution batteries according to Examples 4-4 and 4-8, and Comparative Example 4-4.

Evaluation: Discharge Capacity after Cycles (0° C.)+Discharge Capacity after Storage (0° C.)

For each of the nonaqueous electrolytic solution batteries according to Examples 4-4 and 4-8, and Comparative Example 4-4, discharge capacity after cycles (0° C.) was evaluated as in Example 2-4.

For each of the nonaqueous electrolytic solution batteries according to Examples 4-4 and 4-8, and Comparative Example 4-4, storage tests (stored for 10 days after charged to 3.8 V) were performed at an environmental temperature of 60° C. Subsequently, the cells were cooled to 25° C., and discharged to 1.5 V, and then again charged to 3.8 V at a 0.2 C rate at 0° C., and maintained at 3.8 V for 1 hour. The cells were then discharged to 1.5 V at a 5 C rate while keeping the temperature at 0° C., and the capacity obtained at that time was taken as the discharge capacity after storage (0° C.)

The evaluation results from Example 4-4 and 4-8 are shown in Table 10 as relative values when the evaluation results from Comparative Example 4-4 are taken as 100.

Examples 3-1 to 3-16 and Comparative Example 3-1

TABLE 10

|  | Positive electrode | Negative electrode | Electrolytic solution number | Discharge capacity after cycles, 0° C. Relative value | Discharge capacity after storage, 0° C. Relative value |
|---|---|---|---|---|---|
| Example 3-1 | NMC | Graphite | 35 | 125 | 116 |
| Example 3-2 | Same as above | Same as above | 36 | 125 | 118 |

TABLE 10-continued

|  | Positive electrode | Negative electrode | Electrolytic solution number | Discharge capacity after cycles, 0° C. Relative value | Discharge capacity after storage, 0° C. Relative value |
|---|---|---|---|---|---|
| Example 3-3 | Same as above | Same as above | 37 | 125 | 120 |
| Example 3-4 | Same as above | Same as above | 38 | 125 | 120 |
| Example 3-5 | Same as above | Same as above | 39 | 125 | 120 |
| Example 3-6 | Same as above | Same as above | 40 | 115 | 114 |
| Example 3-7 | Same as above | Same as above | 41 | 115 | 114 |
| Example 3-8 | Same as above | Same as above | 42 | 120 | 118 |
| Example 3-9 | Same as above | Same as above | 43 | 115 | 115 |
| Example 3-10 | Same as above | Same as above | 4 | 125 | 115 |
| Example 3-11 | Same as above | Same as above | 11 | 125 | 115 |
| Example 3-12 | Same as above | Same as above | 13 | 125 | 115 |
| Example 3-13 | Same as above | Same as above | 15 | 115 | 112 |
| Example 3-14 | Same as above | Same as above | 17 | 115 | 112 |
| Example 3-15 | Same as above | Same as above | 19 | 120 | 115 |
| Example 3-16 | Same as above | Same as above | 21 | 115 | 117 |
| Comparative Example 3-1 | Same as above | Same as above | 7 | 100 | 100 |

The nonaqueous electrolytic solution batteries containing the difluoro ionic complexes both in the cis and trans configurations according to Examples were found to be able to improve the discharge capacity after storage (0° C.) without reducing the discharge capacity after cycles (0° C.) as compared with the nonaqueous electrolytic solution battery containing the ionic complex in the cis configuration only. For example, in Examples 3-1 to 3-3, it was found that the discharge capacity after storage (0° C.) tended to be slightly improved without impairing the discharge capacity after cycles (0° C.) as the ratio of the difluoro ionic complex (1a-Trans) in the trans configuration to the difluoro ionic complex (1a-Cis) in the cis configuration increased from 0.2 mass % to 0.5 mass % and 1.0 mass %. Comparison of Examples 3-9 and 3-16, 3-8 and 3-15, 3-6 and 3-13, and 3-7 and 3-14 for each revealed that addition of (1b-Trans), (1c-Trans), (6c-Trans), and (6d-Trans) to the corresponding difluoro ionic complexes in the cis configuration also slightly improved the discharge capacity after storage (0° C.) without impairing the discharge capacity after cycles (0° C.) although the effect is smaller than that of (1a-Trans). The effects of (1b-Trans) and (1c-Trans) were similar to that of (1a-Trans). Comparison of Examples 3-3, 3-4, and 3-5 with Examples 3-6 and 3-7 revealed that the effect was decreased in a case where the anion was the same, but the cations of Li, Na, and K were replaced with TMPA or PP13. This, as described above, may be because the content of anions as the effective moieties was decreased due to the large molecular weights of the cations, and because some of TMPA and PP13 were reductively or oxidatively decomposed, and decomposition residues were deposited as highly resistive materials on the surface of an electrode.

Examples 4-1 to 4-8 and Comparative Examples 4-1 to 4-4

TABLE 11

|  | Positive electrode | Negative electrode | Electrolytic solution number | Discharge capacity after cycles, 0° C. Relative value | Discharge capacity after storage, 0° C. Relative value |
|---|---|---|---|---|---|
| Example 4-1 | NMC | Graphite | 44 | 115 | 107 |
| Example 4-5 | Same as above | Same as above | 23 | 115 | 105 |
| Comparative Example 4-1 | Same as above | Same as above | 24 | 100 | 100 |
| Example 4-2 | Same as above | Same as above | 45 | 120 | 114 |
| Example 4-6 | Same as above | Same as above | 26 | 120 | 110 |
| Comparative Example 4-2 | Same as above | Same as above | 27 | 100 | 100 |
| Example 4-3 | Same as above | Same as above | 46 | 120 | 114 |
| Example 4-7 | Same as above | Same as above | 29 | 120 | 110 |
| Comparative Example 4-3 | Same as above | Same as above | 30 | 100 | 100 |
| Example 4-4 | $NaFe_{0.5}Co_{0.5}O_2$ | Hard carbon | 47 | 140 | 125 |
| Example 4-8 | Same as above | Same as above | 32 | 140 | 120 |
| Comparative Example 4-4 | Same as above | Same as above | 33 | 100 | 100 |

Comparison of Examples 4-1 and 4-5, 4-2 and 4-6, 4-3 and 4-7, and 4-4 and 4-8 for each revealed that the nonaqueous electrolytic solution batteries according to Examples containing the difluoro ionic complexes both in the cis and trans configurations and containing $LiBF_4$, LiFSI, LiDFPI, or NaPF$_6$ as a solute were found to be able to improve the discharge capacity after storage (0° C.) without reducing the discharge capacity after cycles (0° C.) as compared with the nonaqueous electrolytic solution battery containing the ionic complex in the cis configuration only.

Production of Nonaqueous Electrolytic Solution Batteries (5)

Aluminum laminate housing cells (with a capacity of 30 mAh) including the above test NMC positive electrode, the above test graphite negative electrode, and a cellulose separator impregnated with one of the electrolytic solutions (48 to 50, 4, and 7) shown in Tables 1 and 5 were assembled to obtain the nonaqueous electrolytic solution batteries according to Examples 5-1 to 5-4, and Comparative Example 5-1.

Evaluation: Gas Yield During Storage of Electrolytic Solution+Discharge Capacity after Cycles (0° C.)

For each of the electrolytic solutions for nonaqueous electrolytic solution batteries according to Examples 5-1 to 5-4, and Comparative Example 5-1, accelerated tests were performed to evaluate the stability during storage. A 20 L stainless steel pressure container equipped with a pressure gage was filled with 21 kg of one of the electrolytic solutions for nonaqueous electrolytic solution batteries, and stored at an environmental temperature of 45° C. for two months. Then, the internal pressure of the container was measured at an environmental temperature of 25° C. to calculate the amount of gas generated during storage.

For each of the nonaqueous electrolytic solution batteries according to Examples 5-1 to 5-4, and Comparative Example 5-1, discharge capacity after cycles (0° C.) was evaluated as in Example 1-1.

The evaluation results from Example 5-1 to 5-4 are shown in Table 11 as relative values when the evaluation results of Comparative Example 5-1 are taken as 100.

Examples 5-1 to 5-4 and Comparative Example 5-1

5-3 were compared with 5-4, addition of the tetrafluoro ionic complex (5a) was found to have no adverse effect on the discharge capacity after cycles (0° C.)

Production of Nonaqueous Electrolytic Solution Batteries (6)

Aluminum laminate housing cells (with a capacity of 30 mAh) including the above test NMC positive electrode, the above test graphite negative electrode, and a cellulose separator impregnated with one of the electrolytic solutions (51 to 61, 2, 4, 5, and 7) shown in Tables 1 and 6 were assembled to obtain the nonaqueous electrolytic solution batteries according to Examples 6-1 to 6-14, and Comparative Example 6-1.

Evaluation: Gas Yield During Storage of Electrolytic Solution+Discharge Capacity after Cycles (0° C.)+Discharge Capacity after Storage (0° C.)

For each of the electrolytic solutions for nonaqueous electrolytic solution batteries according to Examples 6-1 to 6-14, and Comparative Example 6-1, gas yield during storage were evaluated as in Example 5-1.

For each of the nonaqueous electrolytic solution batteries according to Examples 6-1 to 6-14, and Comparative Example 6-1, discharge capacity after cycles (0° C.) was evaluated as in Example 1-1.

For each of the nonaqueous electrolytic solution batteries according to Examples 6-1 to 6-14, and Comparative Example 6-1, discharge capacity after storage (0° C.) was evaluated as in Example 3-1.

The evaluation results from Examples 6-1 to 6-14 are shown in Table 13 as relative values when the evaluation results of Comparative Example 6-1 are taken as 100.

TABLE 12

| | Positive electrode | Negative electrode | Electrolytic solution number | Gas yield during storage of electrolytic solution* | Discharge capacity after cycles, 0° C. Relative value |
|---|---|---|---|---|---|
| Example 5-1 | NMC | Graphite | 48 | 160 | 125 |
| Example 5-2 | Same as above | Same as above | 49 | 150 | 125 |
| Example 5-3 | Same as above | Same as above | 50 | 135 | 125 |
| Comparative Example 5-1 | Same as above | Same as above | 7 | 100 | 100 |
| Example 5-4 | Same as above | Same as above | 4 | 170 | 125 |

*Before assembling aluminum laminate housing cells (Note that an electrolytic solution before performing storage tests was used when assembling batteries to be subjected to change/discharge tests)

The electrolytic solutions for nonaqueous electrolytic solution batteries containing the difluoro ionic complex (1a-Cis) and the tetrafluoro ionic complex (5a) according to Examples 5-1 to 5-3 were found to generate a less amount of gas during storage, preventing an increase in the internal pressure as compared with the electrolytic solution for nonaqueous electrolytic solution batteries (Example 5-4) which did not contain the tetrafluoro ionic complex (5a). When Examples 5-1 to 5-3 were compared, this gas generation-preventing effect was found to be enhanced as the proportion of the tetrafluoro ionic complex (5a) to the difluoro ionic complex (1a-Cis) increased from 7 mass % to 12 mass % and 20 mass %. Further, when Examples 5-1 to Examples 6-1 to 6-14 and Comparative Example 6-1

TABLE 13

| | Positive electrode | Negative electrode | Electrolytic solution number |
|---|---|---|---|
| Example 6-1 | NMC | Graphite | 51 |
| Example 6-2 | Same as above | Same as above | 52 |
| Example 6-3 | Same as above | Same as above | 53 |

TABLE 13-continued

| | Positive electrode | Negative electrode | Electrolytic solution number |
|---|---|---|---|
| Example 6-4 | Same as above | Same as above | 54 |
| Example 6-5 | Same as above | Same as above | 55 |
| Example 6-6 | Same as above | Same as above | 56 |
| Example 6-7 | Same as above | Same as above | 57 |
| Example 6-8 | Same as above | Same as above | 58 |
| Example 6-9 | Same as above | Same as above | 59 |
| Example 6-10 | Same as above | Same as above | 60 |
| Example 6-11 | Same as above | Same as above | 61 |
| Comparative Example 6-1 | Same as above | Same as above | 7 |
| Example 6-12 | Same as above | Same as above | 2 |
| Example 6-13 | Same as above | Same as above | 4 |
| Example 6-14 | Same as above | Same as above | 5 |

TABLE 14

| | Electrolytic solution number | Gas yield during storage of electrolytic solution* | Discharge capacity after cycles, 0° C. Relative value | Discharge capacity after storage, 0° C. Relative value |
|---|---|---|---|---|
| Example 6-1 | 51 | 105 | 110 | 106 |
| Example 6-2 | 52 | 105 | 110 | 108 |
| Example 6-3 | 53 | 160 | 125 | 116 |
| Example 6-4 | 54 | 150 | 125 | 118 |
| Example 6-5 | 55 | 135 | 125 | 120 |
| Example 6-6 | 56 | 170 | 120 | 113 |
| Example 6-7 | 57 | 150 | 120 | 115 |
| Example 6-8 | 58 | 135 | 125 | 120 |
| Example 6-9 | 59 | 135 | 125 | 120 |
| Example 6-10 | 60 | 140 | 115 | 117 |
| Example 6-11 | 61 | 140 | 115 | 117 |
| Comparative Example 6-1 | 7 | 100 | 100 | 100 |
| Example 6-12 | 2 | 110 | 110 | 105 |
| Example 6-13 | 4 | 170 | 125 | 115 |
| Example 6-14 | 5 | 200 | 120 | 110 |

*Before assembling aluminum laminate housing cells (Note that an electrolytic solution before performing storage tests was used when assembling batteries to be subjected to change/discharge tests)

The electrolytic solutions for nonaqueous electrolytic solution batteries containing three compounds of the difluoro ionic complexes (1a-Cis) and (1a-Trans) in the cis and trans configurations and the tetrafluoro ionic complex (5a) according to Examples 6-1 to 6-7 were found to generate a less amount of gas during storage, preventing an increase in the internal pressure as compared with the electrolytic solutions for nonaqueous electrolytic solution batteries (Examples 6-12, 6-13, and 6-14) which did not contain the tetrafluoro ionic complex (5a), but had the same loading amount of (1a-Cis). Further, comparison of Examples 6-3 and 3-1, Examples 6-4 and 3-2, and Examples 6-5 and 3-3 reveals that the tetrafluoro ionic complex (5a) added here has no adverse effect on the effects of the difluoro ionic complexes (1a-Cis) and (1a-Trans).

Further, Examples 6-8 to 6-11 shows that there is no significant difference in the effect from addition of the difluoro ionic complex even after cations of $Li^+$ were replaced with any of $Na^+$, $K^+$, TMPA, or PP13. Moreover, comparison of Examples 6-12 to 14 with Comparative Example 6-1 shows that the gas yield during storage is increased as the loading amount of (1a-Cis) increases.

As described above, the nonaqueous electrolytic solution batteries containing the difluoro ionic complex (1-Cis) in the cis configuration can significantly improve the discharge capacity after cycles (0° C.). Further addition of the difluoro ionic complex (1-Trans) in the trans configuration can improve the discharge capacity after storage (0° C.) without having an adverse effect on the discharge capacity after cycles (0° C.) Still further addition of the tetrafluoro ionic complex (5) can improve the storage stability of an electrolytic solution without reducing the discharge capacity after cycles (0° C.) and discharge capacity after storage (0° C.) of a nonaqueous electrolytic solution battery.

Example 7-1 and Comparative Example 7-1

Production of $LiNi_{0.85}Co_{0.10}Al_{0.05}O_2$ (NCA) Positive Electrode

A $LiNi_{0.85}Co_{0.10}Al_{0.05}O_2$ (NCA) powder (Todakogyo Corp.) as a lithium-nickel-cobalt-aluminum composite oxide and acetylene black (electrically conductive agent) were dry-mixed, and uniformly dispersed and mixed into NMP where PVDF as a binding agent was pre-dissolved, and NMP for adjusting the viscosity was further added to prepare a NCA mixture paste. The resulting paste was applied to an aluminum foil (current collector), dried, and pressurized. Then the aluminum foil was processed into a predetermined size to obtain a test NCA positive electrode. The ratio of solid contents in the positive electrode was NCA:electrically conductive agent:PVDF=85:5:10 (by the mass ratio).

Production of Nonaqueous Electrolytic Solution Batteries (7-1)

Aluminum laminate housing cells (with a capacity of 30 mAh) including the above test NCA positive electrode, the above test graphite negative electrode, and a cellulose separator impregnated with one of the electrolytic solutions (54 and 7) shown in Tables 1 and 6 were assembled to obtain the nonaqueous electrolytic solution batteries according to Example 7-1 and Comparative Example 7-1.

Evaluation: Discharge Capacity after Cycles (0° C.)+Discharge Capacity after Storage (0° C.)

For each of the nonaqueous electrolytic solution batteries according to Example 7-1 and Comparative Example 7-1, charge and discharge tests (500 times, at a 3 C rate, 3.0 to 4.2 V) were performed at an environmental temperature of 60° C. Subsequently, the cells were cooled to 25° C., and discharged to 3.0 V, and then again charged to 4.2 V at a 0.2 C rate at 0° C., and maintained at 4.2 V for 1 hour. The cells were then discharged to 3.0 V at a 5 C rate while keeping the temperature at 0° C., and the capacity obtained at that time was taken as the discharge capacity after cycles (0° C.)

For each of the nonaqueous electrolytic solution batteries according to Example 7-1 and Comparative Example 7-1, storage tests (stored for 10 days after charged to 4.2 V) were performed at an environmental temperature of 60° C. Subsequently, the cells were cooled to 25° C., and discharged to 3.0 V, and then again charged to 4.2 V at a 0.2 C rate at 0° C., and maintained at 4.2 V for 1 hour. The cells were then discharged to 3.0 V at a 5 C rate while keeping the temperature at 0° C., and the capacity obtained at that time was taken as the discharge capacity after storage (0° C.)

The evaluation results from Example 7-1 are shown in Table 15 as relative values when the evaluation results of Comparative Example 7-1 are taken as 100.

Example 7-2 and Comparative Example 7-2

Production of $LiMn_{1.95}Al_{0.05}O_4$ (LMO) Positive Electrode

A $LiMn_{1.95}Al_{0.05}O_4$ (LMO) powder as a lithium-manganese composite oxide and acetylene black (electrically conductive agent) were dry-mixed, and uniformly dispersed and mixed into NMP where PVDF as a binding agent was pre-dissolved, and NMP for adjusting the viscosity was further added to prepare an LMO mixture paste. The resulting paste was applied to an aluminum foil (current collector), dried, and pressurized. Then the aluminum foil was processed into a predetermined size to obtain a test LMO positive electrode. The ratio of solid contents in the positive electrode was LMO:electrically conductive agent: PVDF=85:5:10 (by the mass ratio).

Production of Nonaqueous Electrolytic Solution Batteries (7-2)

Aluminum laminate housing cells (with a capacity of 30 mAh) including the above test LMO positive electrode, the above test graphite negative electrode, and a microporous polypropylene-polyethylene double layered separator impregnated with one of the electrolytic solutions (54 and 7) shown in Tables 1 and 7 were assembled to obtain the nonaqueous electrolytic solution batteries according to Example 7-2 and Comparative Example 7-2. It is noted that the separator was arranged so that polypropylene was located in the side of the positive electrode.

Evaluation: Discharge Capacity after Cycles (0° C.)+Discharge Capacity after Storage (0° C.)

Example 7-2 and Comparative Example 7-2 were also evaluated for the discharge capacity after cycles (0° C.)+the discharge capacity after storage (0° C.) as in Example 7-1 and Comparative Example 7-1. It is noted that the evaluation results from Example 7-2 are shown in Table 15 as relative values when the evaluation results of Comparative Example 7-2 are taken as 100.

Example 7-3 and Comparative Example 7-3

Production of $LiFePO_4$ (LFP) Positive Electrode

A $LiFePO_4$ (LFP) powder as a lithium-containing olivine-type phosphate salt, acetylene black (electrically conductive agent 1), and vapor-grown carbon fiber (VGCF®-H, Showa Denko K. K.) (electrically conductive agent 2) were dry-mixed, and uniformly dispersed and mixed into NMP in which PVDF as a binding agent was pre-dissolved, and NMP for adjusting the viscosity was further added to prepare an LFP mixture paste. The resulting paste was applied to an aluminum foil (current collector), dried, and pressurized. Then the aluminum foil was processed into a predetermined size to obtain a test LFP positive electrode. The ratio of solid contents in the negative electrode was LFP:electrically conductive agent 1:electrically conductive agent 2:PVDF=85:4:1:10 (by the mass ratio).

Production of Nonaqueous Electrolytic Solution Batteries (7-3)

Aluminum laminate housing cells (with a capacity of 30 mAh) including the above test LFP positive electrode, the above test graphite negative electrode, and a microporous polypropylene-polyethylene double layered separator impregnated with one of the electrolytic solutions (54 and 7) shown in Tables 1 and 6 were assembled to obtain the nonaqueous electrolytic solution batteries according to Example 7-3 and Comparative Example 7-3. It is noted that the separator was arranged so that polypropylene was located in the side of the positive electrode.

Evaluation: Discharge Capacity after Cycles (0° C.)+Discharge Capacity after Storage (0° C.)

For each of the nonaqueous electrolytic solution batteries according to Example 7-3 and Comparative Example 7-3, charge and discharge tests (500 times, at a 3 C rate, 2.0 to 4.0 V) were performed at an environmental temperature of 60° C. Subsequently, the cells were cooled to 25° C., and discharged to 2.0 V, and then again charged to 4.0 V at a 0.2 C rate at 0° C., and maintained at 4.0 V for 1 hour. The cells were then discharged to 2.0 V at a 5 C rate while keeping the temperature at 0° C., and the capacity obtained at that time was taken as the discharge capacity after cycles (0° C.)

For each of the nonaqueous electrolytic solution batteries according to Example 7-3 and Comparative Example 7-3, storage tests (stored for 10 days after charged to 4.0 V) were performed at an environmental temperature of 60° C. Subsequently, the cells were cooled to 25° C., and discharged to 2.0 V, and then again charged to 4.0 V at a 0.2 C rate at 0° C., and maintained at 4.0 V for 1 hour. The cells were then discharged to 2.0 V at a 5 C rate while keeping the temperature at 0° C., and the capacity obtained at that time was taken as the discharge capacity after storage (0° C.)

The evaluation results from Example 7-3 are shown in Table 15 as relative values when the evaluation results of Comparative Example 7-3 are taken as 100.

Example 7-4 and Comparative Example 7-4

Production of Amorphous-Carbon Negative Electrode

Carbotron® P from Kureha Corporation as an amorphous carbon powder was uniformly dispersed and mixed into NMP in which PVDF as a binding agent was pre-dissolved, and NMP for adjusting the viscosity was then further added to prepare an amorphous-carbon mixture paste. The above paste was applied to a copper foil (current collector), dried, and pressurized. Then the copper foil was processed into a predetermined size to obtain a test amorphous-carbon negative electrode. The ratio of solid contents in the negative electrode was amorphous carbon powder:PVDF=90:10 (by the mass ratio). Production of nonaqueous electrolytic solution batteries (7-4)

Aluminum laminate housing cells (with a capacity of 30 mAh) including the above test NMC positive electrode, the above test graphite negative electrode, and a microporous polypropylene-polyethylene double layered separator impregnated with one of the electrolytic solutions (62 and 63) shown in Table 7 were assembled to obtain the nonaqueous electrolytic solution batteries according to Example 7-4 and Comparative Example 7-4. It is noted that the separator was arranged so that polypropylene was located in the side of the positive electrode.

Evaluation: Discharge Capacity after Cycles (0° C.)+Discharge Capacity after Storage (0° C.)

For each of the nonaqueous electrolytic solution batteries according to Example 7-4 and Comparative Example 7-4, charge and discharge tests (500 times, at a 3 C rate, 2.7 to 4.2 V) were performed at an environmental temperature of 60° C. Subsequently, the cells were cooled to 25° C., and discharged to 2.7 V, and then again charged to 4.2 V at a 0.2 C rate at 0° C., and maintained at 4.2 V for 1 hour. The cells were then discharged to 2.7 V at a 5 C rate while keeping the temperature at 0° C., and the capacity obtained at that time was taken as the discharge capacity after cycles (0° C.)

For each of the nonaqueous electrolytic solution batteries according to Example 7-4 and Comparative Example 7-4, storage tests (stored for 10 days after charged to 4.2 V) were performed at an environmental temperature of 60° C. Subsequently, the cells were cooled to 25° C., and discharged to 2.7 V, and then again charged to 4.2 V at a 0.2 C rate at 0° C., and maintained at 4.2 V for 1 hour. The cells were then discharged to 2.7 V at a 5 C rate while keeping the temperature at 0° C., and the capacity obtained at that time was taken as the discharge capacity after storage (0° C.)

The evaluation results from Example 7-4 are shown in Table 15 as relative values when the evaluation results from Comparative Example 7-4 are taken as 100.

Example 7-5 and Comparative Example 7-5

Production of Test (Mixture of Artificial Graphite+Natural Graphite) Negative Electrode An SCMG®-AR powder from Showa Denko K. K. as artificial graphite and natural graphite particles (the mean particle size: 25 μm) from Kansai Coke and Chemicals Company, Ltd. as natural graphite were uniformly dispersed and mixed into NMP in which PVDF as a binding agent was pre-dissolved, and NMP for adjusting the viscosity was then further added to prepare a mixture paste of a mixture of (artificial graphite+natural graphite). The above paste was applied to a copper foil (current collector), dried, and pressurized. Then the copper foil was processed into a predetermined size to obtain a test (mixture of artificial graphite+natural graphite) negative electrode. The ratio of solid contents in the negative electrode was artificial graphite powder:natural graphite powder:PVDF=72:18:10 (by the mass ratio).

Production of Nonaqueous Electrolytic Solution Batteries (7-5)

Aluminum laminate housing cells (with a capacity of 30 mAh) including the above test NMC positive electrode, the above test (mixture of artificial graphite+natural graphite) negative electrode, and a microporous polypropylene-polyethylene double layered separator impregnated with one of the electrolytic solutions (64 and 65) shown in Table 7 were assembled to obtain the nonaqueous electrolytic solution batteries according to Example 7-5 and Comparative Example 7-5. It is noted that the separator was arranged so that polypropylene was located in the side of the positive electrode.

Evaluation: Discharge Capacity after Cycles (0° C.)+Discharge Capacity after Storage (0° C.)

For each of the nonaqueous electrolytic solution batteries according to Example 7-5 and Comparative Example 7-5, charge and discharge tests (500 times, at a 3 C rate, 3.0 to 4.3 V) were performed at an environmental temperature of 60° C. Subsequently, the cells were cooled to 25° C., and discharged to 3.0 V, and then again charged to 4.3 V at a 0.2 C rate at 0° C., and maintained at 4.3 V for 1 hour. The cells were then discharged to 3.0 V at a 5 C rate while keeping the temperature at 0° C., and the capacity obtained at that time was taken as the discharge capacity after cycles (0° C.)

For each of the nonaqueous electrolytic solution batteries according to Example 7-5 and Comparative Example 7-5, storage tests (stored for 10 days after charged to 4.3 V) were performed at an environmental temperature of 60° C. Subsequently, the cells were cooled to 25° C., and discharged to 3.0 V, and then again charged to 4.3 V at a 0.2 C rate at 0° C., and maintained at 4.3 V for 1 hour. The cells were then discharged to 3.0 V at a 5 C rate while keeping the temperature at 0° C., and the capacity obtained at that time was taken as the discharge capacity after storage (0° C.)

The evaluation results from Example 7-5 are shown in Table 15 as relative values when the evaluation results from Comparative Example 7-5 are taken as 100.

Example 7-6 and Comparative Example 7-6

Production of $SiO_x$ Negative Electrode

A powder mixture of a silicon oxide powder disproportioned by heat treatment ($SiO_x$ wherein x is 0.3 to 1.6, the mean particle size: 5 μm, Sigma Aldrich Japan, Inc.) as a silicon oxide powder and MAG-D (the particle size: 20 μm or less) from Hitachi Chemical Co., Ltd. as an aggregated artificial graphite powder was uniformly dispersed and mixed into NMP in which PVDF as a binding agent was pre-dissolved, and Ketjen black (electrically conductive agent) was further added and mixed, and NMP for adjusting the viscosity was then further added to prepare an $SiO_x$ mixture paste. The above paste was applied to a copper foil (current collector), dried, and pressurized. Then the copper foil was processed into a predetermined size to obtain a test $SiO_x$ negative electrode. The ratio of solid contents in the negative electrode was $SiO_x$:MAG-D:electrically conductive agent:PVDF=35:47:8:10 (by the mass ratio). It is noted that the amounts of the NMC positive-electrode active material and the $SiO_x$ powder were adjusted so that the charge capacity of the $SiO_x$ negative electrode is larger than the charge capacity of the NMC positive electrode, and the applied amount was also adjusted so that a lithium metal was not deposited on the $SiO_x$ negative electrode in the middle of charging.

Production of Nonaqueous Electrolytic Solution Batteries (7-6)

Aluminum laminate housing cells (with a capacity of 30 mAh) including the above test NMC positive electrode, the above test $SiO_x$ negative electrode, and a microporous polypropylene-polyethylene double layered separator impregnated with one of the electrolytic solutions (66 and 67) shown in Table 7 were assembled to obtain the nonaqueous electrolytic solution batteries according to Example 7-6 and Comparative Example 7-6. It is noted that the separator was arranged so that polypropylene was located in the side of the positive electrode.

Evaluation: Discharge Capacity after Cycles (0° C.)+Discharge Capacity after Storage (0° C.)

For each of the nonaqueous electrolytic solution batteries according to Example 7-6 and Comparative Example 7-6, charge and discharge tests (200 times, charge: a 1 C rate, discharge: a 2 C rate, and 2.5 to 4.2 V) were performed at an environmental temperature of 60° C. Subsequently, the cells were cooled to 25° C., and discharged to 2.5 V, and then again charged to 4.2 V at a 0.2 C rate at 0° C., and maintained at 4.2 V for 1 hour. The cells were then discharged to 2.5 V at a 3 C rate while keeping the temperature at 0° C., and the capacity obtained at that time was taken as the discharge capacity after cycles (0° C.)

For each of the nonaqueous electrolytic solution batteries according to Example 7-6 and Comparative Example 7-6, storage tests (stored for 10 days after charged to 4.2 V) were performed at an environmental temperature of 60° C. Subsequently, the cells were cooled to 25° C., and discharged to 2.5 V, and then again charged to 4.2 V at a 0.2 C rate at 0° C., and maintained at 4.2 V for 1 hour. The cells were then discharged to 2.5 V at a 3 C rate while keeping the temperature at 0° C., and the capacity obtained at that time was taken as the discharge capacity after storage (0° C.)

The evaluation results from Example 7-6 are shown in Table 15 as relative values when the evaluation results from Comparative Example 7-6 are taken as 100.

Example 7-7 and Comparative Example 7-7

Production of Test Si Negative Electrode

An Si powder (a powder mixture with the mean particle size: 10 μm/6 μm=9/1 by the mass ratio) as an Si powder was uniformly dispersed and mixed into NMP in which PVDF as a binding agent was pre-dissolved, and Ketjen black (electrically conductive agent 1) and vapor-grown carbon fiber (VGCF®-H, Showa Denko K. K.) (electrically conductive agent 2) were further added and mixed, and NMP for adjusting the viscosity was then further added to prepare an Si mixture paste. The above paste was applied to a copper foil (current collector), dried, and pressurized. Then the copper foil was processed into a predetermined size to obtain a test Si negative electrode. The ratio of solid contents in the negative electrode was Si powder:electrically conductive agent 1:electrically conductive agent 2:PVDF=78:7:3:12 (by the mass ratio). It is noted that the amounts of the NMC positive-electrode active material and the Si powder were adjusted so that the charge capacity of the Si negative electrode is larger than the charge capacity of the NMC positive electrode, and the applied amount was adjusted so that a lithium metal was not deposited on the Si negative electrode in the middle of charging.

Production of Nonaqueous Electrolytic Solution Batteries (7-7)

Aluminum laminate housing cells (with a capacity of 30 mAh) including the above test NMC positive electrode, the above test Si negative electrode, and a microporous polypropylene-polyethylene double layered separator impregnated with one of the electrolytic solutions (66 and 67) shown in Table 7 were assembled to obtain the nonaqueous electrolytic solution batteries according to Example 7-7 and Comparative Example 7-7. It is noted that the separator was arranged so that polypropylene was located in the side of the positive electrode.

Evaluation: Discharge Capacity after Cycles (0° C.)+Discharge Capacity after Storage (0° C.)

Example 7-7 and Comparative Example 7-7 were also evaluated for the discharge capacity after cycles (0° C.) and the discharge capacity after storage (0° C.) as in Example 7-6 and Comparative Example 7-6. It is noted that the evaluation results from Example 7-7 are shown in Table 15 as relative values when the evaluation results from Comparative Example 7-7 are taken as 100.

Example 7-8 and Comparative Example 7-8

Production of Test Sn Negative Electrode

An Sn powder with a mean particle size of 10 μm as an Sn powder was uniformly dispersed and mixed into NMP in which PVDF as a binding agent was pre-dissolved, and graphite (KS-15, Lonza) (electrically conductive agent 1) and a vapor-grown carbon fiber (VGCF®-H, Showa Denko K. K.) (electrically conductive agent 2) were further added and mixed, and NMP for adjusting the viscosity was then further added to prepare an Sn mixture paste. The above paste was applied to a copper foil (current collector), dried, and pressurized. Then the copper foil was processed into a predetermined size to obtain a test Sn negative electrode. The ratio of solid contents in the negative electrode was Sn powder:electrically conductive agent 1:electrically conductive agent 2:PVDF=78:8:3:11 (by the mass ratio). It is noted that the amounts of the NMC positive-electrode active material and the Sn powder were adjusted so that the charge capacity of the Sn negative electrode is larger than the charge capacity of the NMC positive electrode, and the applied amount was also adjusted so that a lithium metal was not deposited on the Sn negative electrode in the middle of charging.

Production of Nonaqueous Electrolytic Solution Batteries (7-8)

Aluminum laminate housing cells (with a capacity of 30 mAh) including the above test NMC positive electrode, the above test Sn negative electrode, and a microporous polypropylene-polyethylene double layered separator impregnated with one of the electrolytic solutions (66 and 67) shown in Table 7 were assembled to obtain the nonaqueous electrolytic solution batteries according to Example 7-8 and Comparative Example 7-8. It is noted that the separator was arranged so that polypropylene was located in the side of the positive electrode.

Evaluation: Discharge Capacity after Cycles (0° C.)+Discharge Capacity after Storage (0° C.)

Example 7-8 and Comparative Example 7-8 were also evaluated for the discharge capacity after cycles (0° C.)+the discharge capacity after storage (0° C.) as in Example 7-6 and Comparative Example 7-6. It is noted that the evaluation results from Example 7-8 are shown in Table 15 as relative values when the evaluation results from Comparative Example 7-8 are taken as 100.

Example 7-9 and Comparative Example 7-9

Production of Test Sn Alloy Negative Electrode

The test Sn alloy negative electrode as used herein was produced in accordance with the procedure described in Japanese Unexamined Patent Application, Publication No. 2008-016424. Briefly, a Co—Sn alloy powder as a raw material was mixed with a carbon powder at a predetermined ratio, and dry-mixed such that the entire loading amount of powders was 10 g. The above mixture was placed in a reaction container as a planetary ball mill along with about 400 g of steel balls with a diameter of 9 mm. The reaction container was replaced with an argon atmosphere, and an operation of running at the rotating speed of 250 rpm for 10 minutes and resting for 10 minutes was repeated until the total operating time became 20 hours. Subsequently, the reaction container was cooled to room temperature, and the synthesized powder of a negative-electrode active material was subjected to composition analysis. Results were as follows: the content of Sn was 49.5 mass %; the content of Co was 29.7 mass %; the content of carbon was 20.8 mass %; the ratio of Co to the total of Sn and Co, Co/(Sn+Co), was 37.5 mass %. It is noted that the content of carbon was measured with a carbon/sulfur analyzer, and the contents of Sn and Co were measured by ICP-MS (the inductively-coupled plasma source mass spectrometry method).

The resulting negative-electrode active material was uniformly dispersed and mixed into NMP in which PVDF as a binding agent was pre-dissolved, and Ketjen black (electrically conductive agent 1) and vapor-grown carbon fiber (VGCF®-H, Showa Denko K. K.) (electrically conductive agent 2) were further added, and NMP for adjusting the viscosity was then further added to prepare an Sn-alloy mixture paste. The above paste was applied to a copper foil (current collector), dried, and pressurized. Then the copper foil was processed into a predetermined size to obtain a test Si negative electrode. The ratio of solid contents in the negative electrode was Co—Sn alloy powder:electrically conductive agent 1:electrically conductive agent 2:PVDF=80:7:3:10 (by the mass ratio). The amounts of the NMC positive-electrode active material and the Sn alloy powder were adjusted so that the charge capacity of the Sn alloy negative electrode is larger than the charge capacity of the NMC positive electrode, and the applied amount was also adjusted so that a lithium metal was not deposited on the Sn alloy negative electrode in the middle of charging.

Production of Nonaqueous Electrolytic Solution Batteries (7-9)

Aluminum laminate housing cells (with a capacity of 30 mAh) including the above test NMC positive electrode, the above test Sn alloy negative electrode, and a microporous polypropylene-polyethylene double layered separator impregnated with one of the electrolytic solutions (66 and 67) shown in Table 7 were assembled to obtain the nonaqueous electrolytic solution batteries according to Example and Comparative Example. It is noted that the separator was arranged so that polypropylene was located in the side of the positive electrode.

Evaluation: Discharge Capacity after Cycles (0° C.)+Discharge Capacity after Storage (0° C.)

Example 7-9 and Comparative Example 7-9 were also evaluated for the discharge capacity after cycles (0° C.) and the discharge capacity after storage (0° C.) as in Example 7-6 and Comparative Example 7-6. It is noted that the evaluation results from Example 7-9 are shown in Table 15 as relative values when the evaluation results from Comparative Example 7-9 are taken as 100.

Example 7-10 and Comparative Example 7-10

Production of Test LTO Negative Electrode

An LTO powder (a powder mixture with the mean particle size: 0.90 μm/3.40 μm=9/1 by the mass ratio) as an $Li_4Ti_5O_{12}$ (LTO) powder was uniformly dispersed and mixed into NMP in which PVDF as a binding agent was pre-dissolved, and Ketjen black (electrically conductive agent 1) and vapor-grown carbon fiber (VGCF®-H, Showa Denko K. K.) (electrically conductive agent 2) were further added and mixed, and NMP for adjusting the viscosity was then further added to prepare an LTO mixture paste. The resulting paste was applied to an aluminum foil (current collector), dried, and pressurized. Then the aluminum foil was processed into a predetermined size to obtain a test LTO negative electrode. The ratio of solid contents in the negative electrode was LTO powder:electrically conductive agent 1:electrically conductive agent 2:PVDF=83:5:2:10 (by the mass ratio).

Production of Nonaqueous Electrolytic Solution Batteries (7-10)

Aluminum laminate housing cells (with a capacity of 30 mAh) including the above test NMC positive electrode, the above test LTO negative electrode, and a cellulose separator impregnated with one of the electrolytic solutions (68 and 69) shown in Table 7 were assembled to obtain the nonaqueous electrolytic solution batteries according to Example 7-10 and Comparative Example 7-10.

Evaluation: Discharge Capacity after Cycles (0° C.)+Discharge Capacity after Storage (0° C.)

For each of the nonaqueous electrolytic solution batteries according to Example 7-10 and Comparative Example 7-10, charge and discharge tests (500 times, a 2 C rate, 1.5 to 2.8 V) were performed at an environmental temperature of 60° C. Subsequently, the cells were cooled to 25° C., and discharged to 1.5 V, and then again charged to 2.8 V at a 0.2 C rate at 0° C., and maintained at 2.8 V for 1 hour. The cells were then discharged to 1.5 V at a 5 C rate while keeping the temperature at 0° C., and the capacity obtained at that time was taken as the discharge capacity after cycles (0° C.)

For each of the nonaqueous electrolytic solution batteries according to Example 7-10 and Comparative Example 7-10, storage tests (stored for 10 days after charged to 2.8 V) were performed at an environmental temperature of 60° C. Subsequently, the cells were cooled to 25° C., and discharged to 1.5 V, and then again charged to 2.8 V at a 0.2 C rate at 0° C., and maintained at 2.8 V for 1 hour. The cells were then discharged to 1.5 V at a 5 C rate while keeping the temperature at 0° C., and the capacity obtained at that time was taken as the discharge capacity after storage (0° C.)

The evaluation results from Example 7-10 are shown in Table 15 as relative values when the evaluation results from Comparative Example 7-10 are taken as 100.

Examples 7-11, 7-12 and Comparative Examples 7-11, 7-12

Production of OLO-1 Positive Electrode

A $0.5[LiNi_{0.5}Mn_{0.5}O_2] \cdot 0.5[Li_2MnO_3]$ (OLO-1) powder, acetylene black (electrically conductive agent 1), and vapor-grown carbon fiber (VGCF®-H, Showa Denko K. K.) (electrically conductive agent 2) were dry-mixed, and uniformly dispersed and mixed into NMP in which PVDF as a binding agent was pre-dissolved, and NMP for adjusting the viscosity was then further added to prepare an OLO-1 mixture paste. The resulting paste was applied to an aluminum foil (current collector), dried, and pressurized. Then the aluminum foil was processed into a predetermined size to obtain a test OLO-1 positive electrode. The ratio of solid contents in the positive electrode was OLO-1:electrically conductive agent 1:electrically conductive agent 2:PVDF=85:4:1:10 (by the mass ratio).

Production of OLO-2 Positive Electrode

A $0.45[LiNi_{0.375}Co_{0.25}Mn_{0.375}O_2] \cdot 0.10 \ [Li_2TiO_3] \cdot 0.45 \ [Li_2MnO_3]$ (OLO-2) powder and acetylene black (electrically conductive agent 1), and vapor-grown carbon fiber (VGCF®-H, Showa Denko K. K.) (electrically conductive agent 2) were dry-mixed, and uniformly dispersed and mixed into NMP in which PVDF as a binding agent was pre-dissolved, and NMP for adjusting the viscosity was then further added to prepare an OLO-2 mixture paste. The resulting paste was applied to an aluminum foil (current collector), dried, and pressurized. Then the aluminum foil was processed into a predetermined size to obtain a test OLO-2 positive electrode. The ratio of solid contents in the positive electrode was OLO-2:electrically conductive agent 1:electrically conductive agent 2:PVDF=85:4:1:10 (by the mass ratio).

Production of Nonaqueous Electrolytic Solution Batteries (7-11, 7-12)

Aluminum laminate housing cells (with a capacity of 30 mAh) including the above test OLO-1 positive electrode or the above test OLO-2 positive electrode, the above test graphite negative electrode, and a cellulose separator impregnated with one of the electrolytic solutions (70 and 71) shown in Table 7 were assembled to obtain the nonaqueous electrolytic solution batteries according to Examples 7-11 and 7-12 and Comparative Example 7-11 and 7-12.

Evaluation: Discharge Capacity after Cycles (0° C.)+Discharge Capacity after Storage (0° C.)

For each of the nonaqueous electrolytic solution batteries according to Example 7-11 and Comparative Example 7-11, charge and discharge tests (500 times, 2.5 to 4.6 V, charge:

a 1 C rate, discharge: a 2 C rate) were performed at an environmental temperature of 60° C. Subsequently, the cells were cooled to 25° C., and discharged to 2.5 V, and then again charged to 4.6 V at a 0.2 C rate at 0° C., and maintained at 4.6 V for 1 hour. The cells were then discharged to 2.5 V at a 3 C rate while keeping the temperature at 0° C., and the capacity obtained at that time was taken as the discharge capacity after cycles (0° C.)

similarly evaluated as in Example 7-11 and Comparative Example 7-11. The evaluation results from Example 7-12 are shown in Table 15 as relative values when the evaluation results from Comparative Example 7-12 are taken as 100.

Examples 7-1 to 7-12 and Comparative Examples 7-1 to 7-12

TABLE 15

|  | Positive electrode | Negative electrode | Electrolytic solution number | Discharge capacity after cycles, 0° C. Relative value | Discharge capacity after storage, 0° C. Relative value |
| --- | --- | --- | --- | --- | --- |
| Example 7-1 | NCA | Graphite | 54 | 129 | 120 |
| Comparative Example 7-1 | Same as above | Same as above | 7 | 100 | 100 |
| Example 7-2 | LMO | Same as above | 54 | 126 | 115 |
| Comparative Example 7-2 | Same as above | Same as above | 7 | 100 | 100 |
| Example 7-3 | LFP | Same as above | 54 | 127 | 117 |
| Comparative Example 7-3 | Same as above | Same as above | 7 | 100 | 100 |
| Example 7-4 | NMC | Amorphous carbon | 62 | 128 | 116 |
| Comparative Example 7-4 | Same as above | Same as above | 63 | 100 | 100 |
| Example 7-5 | Same as above | Artificial graphite + natural graphite | 64 | 127 | 118 |
| Comparative Example 7-5 | Same as above | Same as above | 65 | 100 | 100 |
| Example 7-6 | Same as above | $SiO_x$ negative electrode | 66 | 125 | 114 |
| Comparative Example 7-6 | Same as above | Same as above | 67 | 100 | 100 |
| Example 7-7 | Same as above | Si negative electrode | 66 | 122 | 112 |
| Comparative Example 7-7 | Same as above | Same as above | 67 | 100 | 100 |
| Example 7-8 | Same as above | Sn negative electrode | 66 | 123 | 113 |
| Comparative Example 7-8 | Same as above | Same as above | 67 | 100 | 100 |
| Example 7-9 | Same as above | Co—Sn alloy negative electrode | 66 | 122 | 111 |
| Comparative Example 7-9 | Same as above | Same as above | 67 | 100 | 100 |
| Example 7-10 | Same as above | LTO negative electrode | 68 | 131 | 121 |
| Comparative Example 7-10 | Same as above | Same as above | 69 | 100 | 100 |
| Example 7-11 | OLO-1 | Graphite | 70 | 125 | 118 |
| Comparative Example 7-11 | Same as above | Same as above | 71 | 100 | 100 |
| Example 7-12 | OLO-2 | Graphite | 70 | 120 | 116 |
| Comparative Example 7-12 | Same as above | Same as above | 71 | 100 | 100 |

For each of the nonaqueous electrolytic solution batteries according to Example 7-11 and Comparative Example 7-11, storage tests (stored for 10 days after charged to 4.6 V) were performed at an environmental temperature of 60° C. Subsequently, the cells were cooled to 25° C., and discharged to 2.5 V, and then again charged to 4.6 V at a 0.2 C rate at 0° C., and maintained at 4.6 V for 1 hour. The cells were then discharged to 2.5 V at a 3 C rate while keeping the temperature at 0° C., and the capacity obtained at that time was taken as the discharge capacity after storage (0° C.)

The evaluation results from Example 7-11 are shown in Table 15 as relative values when the evaluation results from Comparative Example 7-11 are taken as 100.

The nonaqueous electrolytic solution batteries according to Example 7-12 and Comparative Example 7-12 were Results from comparison of Examples 7-1 to 7-3, 7-11, and 7-12 with Comparative Examples 7-1 to 7-3, 7-11, and 7-12 in Table 15 show that the difluoro ionic complex (1-Cis) in the cis configuration significantly improved the discharge capacity after cycles (0° C.) of the nonaqueous electrolytic solution batteries, and the difluoro ionic complex (1-Trans) in the trans configuration improved discharge capacity after storage (0° C.) for all the positive-electrode active materials of a lithium transition metal composite oxide containing at least one metal of nickel, manganese, and cobalt and having a layer structure; a lithium-manganese composite oxide having the spinel structure; a lithium-containing olivine-type iron phosphate salt; and a lithium-rich layered transition-metal oxide having the stratified rock-salt structure.

Further, results from comparison of Examples 7-4 to 7-10 with Comparative Example 7-4 to 7-10 in Table 15 show that the difluoro ionic complex (1-Cis) in the cis configuration significantly improved the discharge capacity after cycles (0° C.) of the nonaqueous electrolytic solution batteries, and the difluoro ionic complex (1-Trans) in the trans configuration improved the discharge capacity after storage (0° C.) for all the negative-electrode active materials of a carbon material having a d value of the lattice plane [002] of more than 0.340 nm as determined by X ray diffraction; a carbon material having a d value of the lattice plane [002] of 0.340 nm or less as determined by X ray diffraction; an oxide of one or more metals selected from Si, Sn, and Al; one or more metals selected from Si, Sn, and Al or an alloy comprising the one or more metals, or an alloy of lithium and the one or more metals or the alloy; and a lithium titanium oxide.

That is, these results clearly demonstrate that the nonaqueous electrolytic solution according to the present invention, and the batteries using the same can show high output characteristics at low temperatures even after the batteries are used to some extent, and can also show sufficient performance again at low temperatures even after stored at high temperatures regardless of the positive-electrode active materials and negative-electrode active materials.

The invention claimed is:

1. An electrolytic solution for nonaqueous electrolytic solution secondary batteries, the electrolytic solution including a difluoro ionic complex (1) represented by the general formula (1), a nonaqueous organic solvent, and a solute, wherein 95 mol % or more of the difluoro ionic complex (1) is a difluoro ionic complex (1-Cis) in a cis configuration represented by the general formula (1-Cis),

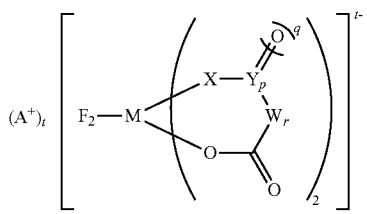

(1)

wherein in (1-Cis),

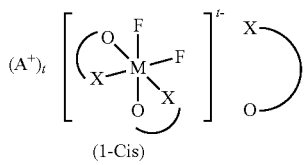

(1-Cis)

is

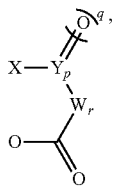

wherein in the general formulas (1) and (1-Cis), $A^+$ is any one selected from the group consisting of a metal ion, a proton, and an onium ion; M is any one selected from the group consisting of Si, P, As, and Sb; F is a fluorine atom; O is an oxygen atom; t is 2 when M is Si, and t is 1 when M is P, As, or Sb; X is an oxygen atom or —N($R^1$)—; N is a nitrogen atom; and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more);

when X is —N($R^1$)— and p is 0, X and W are bonded directly and optionally form a structure as shown in the general formulas (2) to (4) below; in the case of the general formula (3) below where the direct bond is a double bond, $R^1$ is not present,

(2)

(3)

(4)

Y is a carbon atom or a sulfur atom; q is 1 when Y is a carbon atom; q is 1 or 2 when Y is a sulfur atom, W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N($R^2$)—, wherein $R^2$ represents a hydrogen atom, an alkaline metal, or a hydrocarbon group having 1 to 10 carbon atoms and optionally having a hetero atom and/or a halogen atom; when the number of carbon atoms is 3 or more, $R^2$ optionally has a branched-chain or ring structure, and p is 0 or 1, q is an integer of 0 to 2, r is an integer of 0 to 2, and p+r≥1; and wherein the difluoro ionic complex (1) further includes a difluoro ionic complex (1-Trans) in a trans configuration represented by the general formula (1-Trans), wherein in (1-Trans),

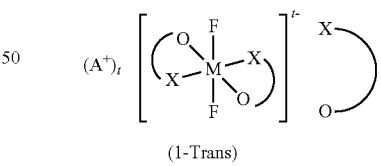

(1-Trans)

is

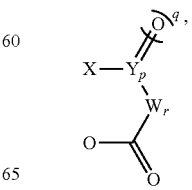

wherein in the general formula (1-Trans), $A^+$ is any one selected from the group consisting of a metal ion, a proton, and an onium ion, M is any one selected from the group consisting of Si, P, As, and Sb; F is a fluorine atom; 0 is an oxygen atom; t is 2 when M is Si; and t is 1 when M is P, As, or Sb; X is an oxygen atom or —N($R^1$)—; N is a nitrogen atom; and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more);
when X is —N($R^1$)—, and p is 0, X and W are bonded directly and optionally form a structure as shown in the general formulas (2) to (4) below; in the case of the general formula (3) below where the direct bond is a double bond, $R^1$ is not present,

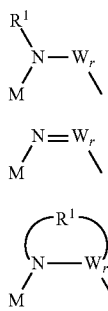

Y is a carbon atom or a sulfur atom; q is 1 when Y is a carbon atom; q is 1 or 2 when Y is a sulfur atom;
W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N($R^2$)—, wherein, $R^2$ represents a hydrogen atom, an alkaline metal, or a hydrocarbon group having 1 to 10 carbon atoms and optionally having a hetero atom and/or a halogen atom; when the number of carbon atoms is 3 or more, $R^2$ optionally has a branched-chain or ring structure; and p is 0 or 1, q is an integer of 0 to 2, r is an integer of 0 to 2, and p+r≥1; and
wherein the ratio of the content of the difluoro ionic complex (1-Trans) relative to the mass of the difluoro ionic complex (1-Cis) is 0.0001 or more and 0.05 or less.

2. The electrolytic solution according to claim 1, wherein elements in the anion moiety of the difluoro ionic complex (1-Cis) are at least one selected from the group consisting of (i), (ii), (iii), and (iv) shown below:

M=P;X=O;Y=C;$p,q$, and $t$=1; and $r$=0, (i)

M=P;X=O;W=C(CF$_3$)$_2$;$p$ and $q$=0; and $r$ and $t$=1, (ii)

M=Si;X=O;Y=C;$p$ and $q$=1;$t$=2; and $r$=0, (iii)

M=P;X=N($R^1$);Y=C;$R^1$=CH$_3$;$p,q$, and $t$=1; and $r$=0. (iv)

3. The electrolytic solution according to claim 1, wherein the A+ in the difluoro ionic complex (1-Cis) is at least one ion selected from the group consisting of a lithium ion, a sodium ion, a potassium ion, and a quaternary alkylammonium ion.

4. The electrolytic solution according to claim 1, wherein the concentration of the difluoro ionic complex (1-Cis) is in the range of 0.001 mass % or more and 20 mass % or less relative to the electrolytic solution for nonaqueous electrolytic solution batteries.

5. The electrolytic solution according to claim 1, wherein elements in the anion moiety of the difluoro ionic complex (1-Trans) are at least one selected from the group consisting of (i), (ii), (iii), and (iv) shown below:

M=P;X=O;Y=C;$p,q$, and $t$=1; and $r$=0 (i)

M=P;X=O;W=C(CF$_3$)$_2$;$p$ and $q$=0; and $r$ and $t$=1 (ii)

M=Si;X=O;Y=C;$p$ and $q$=1;$t$=2; and $r$=0, (iii)

M=P;X=N($R^1$);Y=C;$R^1$=CH$_3$;$p,q$, and $t$=1; and $r$=0. (iv)

6. The electrolytic solution according to claim 1, wherein the $A^+$ in the difluoro ionic complex (1-Trans) is at least one selected from the group consisting of a lithium ion, a sodium ion, a potassium ion, and a quaternary alkylammonium ion.

7. The electrolytic solution according to claim 1, further including a tetrafluoro ionic complex (5) represented by the general formula (5),

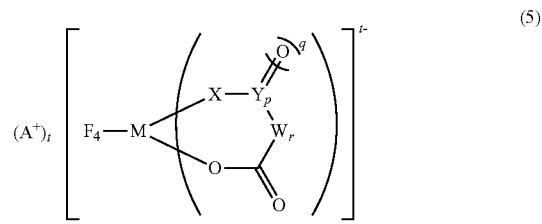

wherein in the general formula (5), $A^+$ is any one selected from the group consisting of a metal ion, a proton, and an onium ion, M is any one selected from the group consisting of Si, P, As, and Sb; F is a fluorine atom; 0 is an oxygen atom; t is 2 when M is Si; and t is 1 when M is P, As, or Sb; X is an oxygen atom or —N($R^1$)—; N is a nitrogen atom, and $R^1$ is a hydrocarbon group having 1 to 10 carbon atoms and optionally having a hetero atom and/or a halogen atom (the hydrocarbon group optionally having a branched-chain or ring structure when the number of carbon atoms is 3 or more);
when X is —N($R^1$)—, and p is 0, X and W are bonded directly and optionally form a structure as shown in the general formulas (2) to (4) below; in the case of the general formula (3) below where the direct bond is a double bond, $R^1$ is not present,

Y is a carbon atom or a sulfur atom; q is 1 when Y is a carbon atom; q is 1 or 2 when Y is a sulfur atom;

W represents a hydrocarbon group having 1 to 10 carbon atoms and optionally having a hetero atom and/or a halogen atom (the hydrocarbon group optionally having a branched-chain or ring structure when the number of carbon atoms is 3 or more), or —N(R$^2$)—, wherein, R$^2$ represents a hydrogen atom, an alkaline metal, or a hydrocarbon group having 1 to 10 carbon atoms and optionally having a hetero atom and/or a halogen atom; when the number of carbon atoms is 3 or more, R$^2$ optionally has a branched-chain or ring structure, and p is 0 or 1, q is an integer of 0 to 2, r is an integer of 0 to 2, and p+r≥1.

8. The electrolytic solution according to claim 7, wherein elements in the anion moiety of the tetrafluoro ionic complex (5) are any one selected from the group consisting of (i), (ii), (iii), and (iv):

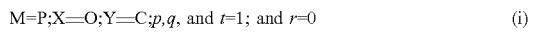  (i)

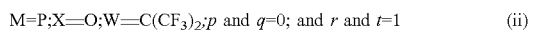  (ii)

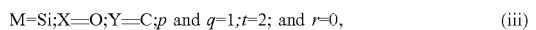  (iii)

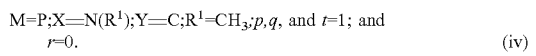  (iv)

9. The electrolytic solution according to claim 7, wherein the A+ in the tetrafluoro ionic complex (5) is at least one ion selected from the group consisting of a lithium ion, a sodium ion, a potassium ion, and a quaternary alkylammonium ion.

10. The electrolytic solution according to claim 7, wherein the ratio of the content of the tetrafluoro ionic complex (5) relative to the mass of the difluoro ionic complex (1-Cis) is 0.02 or more and 0.25 or less.

11. The electrolytic solution according to claim 1, wherein the nonaqueous organic solvent is at least one selected from the group consisting of carbonates, esters, ethers, lactones, nitriles, amides, and sulfones.

12. The electrolytic solution according to claim 11, wherein the nonaqueous organic solvent is at least one selected from the group consisting of ethylmethyl carbonate, dimethyl carbonate, diethyl carbonate, methylpropyl carbonate, ethylpropyl carbonate, methylbutyl carbonate, ethylene carbonate, propylene carbonate, butylene carbonate, methyl acetate, ethyl acetate, methyl propionate, ethyl propionate, diethyl ether, acetonitrile, propionitrile, tetrahydrofuran, 2-methyltetrahydrofuran, furan, tetrahydropyran, 1,3-dioxane, 1,4-dioxane, dibutyl ether, diisopropyl ether, 1,2-dimethoxyethane, N,N-dimethylformamide, dimethyl sulfoxide, sulfolane, γ-butyrolactone, and γ-valerolactone.

13. The electrolytic solution according to claim 11, wherein the nonaqueous organic solvent includes at least one selected from the group consisting of cyclic carbonate and chain carbonate.

14. The electrolytic solution according to claim 13, wherein the cyclic carbonate is at least one selected from the group consisting of ethylene carbonate and propylene carbonate, and the chain carbonate is at least one selected from the group consisting of ethylmethyl carbonate, dimethyl carbonate, diethyl carbonate, and methylpropyl carbonate.

15. The electrolytic solution according to claim 1, wherein the solute is a salt comprising a pair of a cation and an anion, the cation being at least one selected from the group consisting of lithium, sodium, potassium, and quaternary alkylammonium, and the anion being at least one selected from the group consisting of hexafluorophosphoric acid, tetrafluoroboric acid, perchloric acid, hexafluoroarsenic acid, hexafluoroantimonic acid, trifluoromethanesulfonic acid, bis(trifluoromethanesulfonyl)imide, bis(pentafluoroethanesulfonyl)imide, (trifluoromethanesulfonyl)(pentafluoroethanesulfonyl)imide, bis(fluorosulfonyl)imide, (trifluoromethanesulfonyl)(fluorosulfonyl)imide, (pentafluoroethanesulfonyl)(fluorosulfonyl)imide, tris(trifluoromethanesulfonyl)methide, and bis(difluorophosphonyl)imide.

16. A nonaqueous electrolytic solution secondary battery comprising: the electrolytic solution according to claim 1; a positive electrode; a negative electrode; and a separator.

17. A nonaqueous electrolytic solution secondary battery, comprising: (a) the electrolytic solution according to claim 1;
(b) a positive electrode including at least one oxide and/or a polyanion compound as a positive-electrode active material;
(c) a negative electrode including a negative-electrode active material; and
(d) a separator including polyolefin or cellulose as a main component,
wherein the positive-electrode active material is at least one selected from the group consisting of (A) a lithium-transition metal composite oxide containing at least one metal of nickel, manganese, and cobalt, and having a layered structure, (B) a lithium-manganese composite oxide having a spinel structure, (C) a lithium-containing olivine-type phosphate salt, and (D) a lithium-rich layered transition-metal oxide having a stratified rock-salt structure, and
the negative-electrode active material is at least one selected from the group consisting of (E) a carbon material having a d value of a lattice plane [002] of 0.340 nm or less as determined by X ray diffraction, (F) a carbon material having a d value in the lattice plane [002] of more than 0.340 nm as determined by X ray diffraction, (G) an oxide of one or more metals selected from Si, Sn, and Al, (H) one or more metals selected from Si, Sn, and Al, or an alloy comprising the one or more metals, or an alloy of lithium and the one or more metals or the alloy, and (I) a lithium titanium oxide.

18. The nonaqueous electrolytic solution secondary battery according to claim 17, wherein the lithium-rich layered transition-metal oxide having a stratified rock-salt structure is represented by the general formula (1-5),

  (1-5)

wherein in the general formula (1-5), x is a number satisfying 0<x<1, and M$^5$ is at least one metal element having a mean oxidation number of 3$^+$, and M$^6$ is at least one metal element having a mean oxidation number of 4$^+$.

* * * * *